(12) United States Patent
Louis

(10) Patent No.: US 11,732,090 B2
(45) Date of Patent: Aug. 22, 2023

(54) POLY(ETHER KETONE KETONE) POLYMERS, CORRESPONDING SYNTHESIS METHODS AND POLYMER COMPOSITIONS AND ARTICLES MADE THEREFROM

(71) Applicant: SOLVAY SPECIALTY POLYMERS USA, LLC, Alpharetta, GA (US)

(72) Inventor: Chantal Louis, Alpharetta, GA (US)

(73) Assignee: SOLVAY SPECIALTY POLYMERS USA, LLC, Alpharetta, GA (US)

( * ) Notice: Subject to any disclaimer, the term of this patent is extended or adjusted under 35 U.S.C. 154(b) by 1097 days.

(21) Appl. No.: 16/471,493

(22) PCT Filed: Dec. 19, 2017

(86) PCT No.: PCT/EP2017/083672
§ 371 (c)(1),
(2) Date: Jun. 19, 2019

(87) PCT Pub. No.: WO2018/115033
PCT Pub. Date: Jun. 28, 2018

(65) Prior Publication Data
US 2020/0115499 A1 Apr. 16, 2020

Related U.S. Application Data

(60) Provisional application No. 62/456,917, filed on Feb. 9, 2017, provisional application No. 62/437,270, filed on Dec. 21, 2016.

(30) Foreign Application Priority Data

May 3, 2017 (EP) .................................. 17169168

(51) Int. Cl.
*C08G 65/40* (2006.01)
(52) U.S. Cl.
CPC ..... *C08G 65/4093* (2013.01); *C08G 65/4012* (2013.01); *C08G 2650/04* (2013.01); *C08G 2650/40* (2013.01)
(58) Field of Classification Search
CPC C08G 65/4056; C08G 2650/40; C08G 75/23; C08G 75/20; C08J 3/12; C08J 2371/10; B33Y 70/00; B33Y 80/00; C08L 81/06
See application file for complete search history.

(56) References Cited

U.S. PATENT DOCUMENTS

| | | | |
|---|---|---|---|
| 5,250,738 A | 10/1993 | Hackenbruch et al. | |
| 5,300,693 A | 4/1994 | Gilb et al. | |
| 9,175,136 B2 | 11/2015 | Louis | |
| 2006/0134419 A1* | 6/2006 | Monsheimer | C08G 65/40 528/125 |
| 2011/0201775 A1* | 8/2011 | Louis | C08G 65/4012 568/34 |

FOREIGN PATENT DOCUMENTS

| | | |
|---|---|---|
| CN | 1974631 A | 6/2007 |
| EP | 193187 A1 | 9/1986 |
| EP | 323076 A2 | 7/1989 |

OTHER PUBLICATIONS

Murphy J., in "Additives for Plastics Handbook", 2nd Edition, 2001, Chapter 5.2.3., p. 43-48—Elsevier Advanced Technology.
Standard ASTM D3418-08, "Standard Test Method for Transition Temperatures and Enthalpies of Fusion and Crystallization of Polymers by Differential Scanning Calorimetry", 2008, p. 1-7.
Standard ASTM E1356, "Standard Test Method for Assignment of the Glass Transition Temperatures by Differential Scanning Calorimetry", 2012, p. 1-4.
Standard ASTM D2857-95R01, "Standard Practice for Dilute Solution Viscosity of Polymers", 1995, reapprouved 2001, p. 1-6.
Standard ASTM D3850-12, "Standard Test Method for Rapid Thermal Degradation of Solid Electrical Insulating Materials By Thermogravimetric Method (TGA)", 2012, p. 1-4.

* cited by examiner

*Primary Examiner* — Shane Fang
(74) *Attorney, Agent, or Firm* — Osha Bergman Watanabe & Burton LLP

(57) ABSTRACT

Described herein are PEKK polymers having improved processability and improved crystallinity. It was surprisingly found that PEKK polymers formed using a specifically adapted nucleophilic synthesis route, in which different monomers are added in to the polymerization reaction at different points during the synthesis, had lower glass transition temperatures ("Tg") and increased crystallinities, relative to PEKK polymers formed using traditional nucleophilic synthesis routes ("traditional PEKK polymers"). Furthermore, compared with PEKK polymers synthesized using an electrophilic synthesis routes, the PEKK polymers described herein and significantly lower halogen content. The synthesis routes includes a first heating of a first monomer blend in a reaction mixture, a subsequent first addition of a second monomer blend to the reaction mixture, and a second heating of the reaction mixture subsequent to the first addition.

33 Claims, No Drawings

POLY(ETHER KETONE KETONE) POLYMERS, CORRESPONDING SYNTHESIS METHODS AND POLYMER COMPOSITIONS AND ARTICLES MADE THEREFROM

CROSS-REFERENCE TO RELATED APPLICATIONS

This application claims priority to U.S. Provisional Application No. 62/437,270 filed Dec. 21, 2016, U.S. Provisional Application No. 62/456,917 filed Feb. 9, 2017, and European Application No. EP 17169168.6 filed May 3, 2017, the whole content of these applications being incorporated herein by reference for all purposes.

FIELD OF THE INVENTION

The invention relates to poly(ether ketone ketone) polymers. The invention further relates to the synthesis of poly(ether ketone ketone) polymers. The invention still further relates to polymer compositions including the poly(ether ketone ketone) polymers and articles made therefrom.

BACKGROUND OF THE INVENTION

Poly(ether ketone ketone) ("PEKK") polymers are well suited for use in relatively extreme conditions. In part, due to the high crystallinity and high melt temperature of PEKK polymers, they have excellent thermal, physical and mechanical properties. Such properties make PEKK polymers desirable in a wide range of demanding application settings including, but not limited to, aerospace and oil and gas drilling. Nevertheless, the same high crystallinity and high melt temperatures that provide many of the benefits of PEKK polymers also present difficulties in processing. Accordingly, there is an ongoing need to develop PEKK polymers having improved processability while at least retaining their excellent thermal, physical and mechanical properties and improving their crystallinity.

DETAILED DESCRIPTION OF THE INVENTION

Described herein are PEKK polymers having improved processability and improved crystallinity. It was surprisingly found that PEKK polymers formed using a specifically adapted nucleophilic synthesis route, in which different monomers are added to the polymerization reaction at different points during the synthesis, had lower glass transition temperatures ("Tg") and increased crystallinities, relative to PEKK polymers formed using traditional nucleophilic synthesis routes ("traditional PEKK polymers"). Moreover, the PEKK polymers also have very desirable melting temperatures ("$T_m$"). By providing PEKK polymers with lower Tg and improved crystallinities and desirable $T_m$, the PEKK polymers described herein have improved processability while maintaining desirable thermal, physical and mechanical properties.

Furthermore, compared with PEKK polymers synthesized using an electrophilic synthesis route, the PEKK polymers described herein has significantly lower halogen content as well as significantly improved thermal stability. Due to the halogenated acid used to generate the intermediate carbocation during electrophilic addition, PEKK polymers synthesized using an electrophilic synthesis scheme have a significantly elevated residual chlorine concentration, relative to PEKK polymers synthesized via nucleophilic routes. Correspondingly, PEKK polymers synthesized by electrophilic routes must undergo a significant amount of purification to reduce chlorine concentration, for example, for use in consumer electronic device application settings which generally require a chlorine concentration of less than 900 parts per million by weight ("ppm"). In commercially relevant processes (e.g. large scale polymer manufacturing), the costs associated with removal of chlorine can be significant, due to the economies of scale. Accordingly, the PEKK polymers described herein using a nucleophilic synthesis route can provide significant reduction in large scale production costs. Additionally, because PEKK polymers synthesized using an electrophilic route have lower thermal stability, there is a significantly higher rate of defects in parts made from such PEKK polymers, relative to PEKK polymers synthesized using a nucleophilic route as described here.

The Poly(Ether Ether Ketone) Polymers

The PEKK polymers of interest herein contain one or more recurring units ($R^M_{PEKK}$) and one or more recurring units ($R^P_{PEKK}$). Each recurring unit ($R^M_{PEKK}$) is represented by a formula according to the general formula:

each recurring unit ($R^P_{PEKK}$) is represented by a formula according to the following general formula:

where $M_m$ and $M_p$ are represented by the following general formulae, respectively:

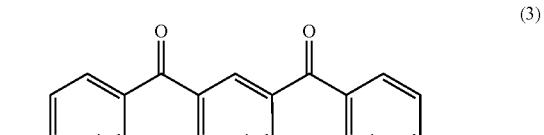

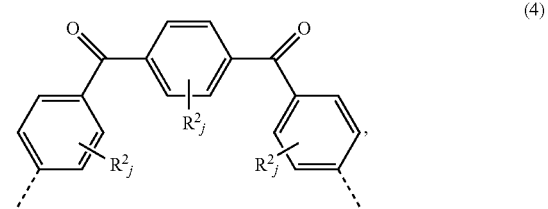

In Formulae (3) and (4), $R^1$ and $R^2$, at each instance, is independently selected from the group consisting of an alkyl, an alkenyl, an alkynyl, an aryl, an ether, a thioether, a carboxylic acid, an ester, an amide, an imide, an alkali or alkaline earth metal sulfonate, an alkyl sulfonate, an alkali or alkaline earth metal phosphonate, an alkyl phosphonate, an amine, and a quaternary ammonium; and i and j, at each instance, is an independently selected integer ranging from 0 to 4. As used herein, a dashed bond indicates a bond to an atom outside of the drawn structure. The subscripts "p" and "m" on the species "M" reflect the respective para (Formulae (4)) and meta (Formula (3)) benzoyl substitutions on the central benzene ring. In some embodiments, each i and j are zero. For clarity, in some embodiments, the PEKK polymer has a plurality of recurring units ($R^M_{PEKK}$), a plurality of recurring unit ($R^P_{PEKK}$), or both, with each recurring unit being distinct. Accordingly, reference to recurring units ($R^M{}_{PEKK}$) references all types of recurring units in PEKK according to general Formula (1) and reference to recurring units ($R^P{}_{PEKK}$) references all types of recurring units in PEKK according to general Formula (2).

As used herein, a PEKK polymer refers to any polymer in which the total concentration of recurring units ($R^M{}_{PEKK}$) and recurring units ($R^P{}_{PEKK}$) is at least 50 mol %, relative to the total number of moles of recurring unit in the PEKK polymer. In some embodiments, the total concentration of recurring units ($R^M{}_{PEKK}$) and recurring units ($R^P{}_{PEKK}$) is at least 60 mol %, at least 70 mol %, at least 80 mol %, at least 90 mol %, at least 95 mol % or at least 99 mol %, relative to the total number of moles of recurring units in the PEKK polymer. In some embodiments, the ratio of the total number of moles of recurring units ($R^P{}_{PEKK}$) to the total number of moles of recurring units ($R^M{}_{PEKK}$) is at least 1:1, at least 1.5:1, at least 1.8:1, at least 1.9:1, or at least 2:1, or at least 2.1:1. Additionally or alternatively, the ratio of the total number of moles of recurring units ($R^P{}_{PEKK}$) to the total number of moles of recurring units ($R^M{}_{PEKK}$) is no more than 5.7:1, no more than 5:1, no more than 4:1, no more than 3.5:1 or no more than 3:1, or no more than 2.7:1.

In some embodiments, recurring units ($R^M{}_{PEKK}$) include a recurring unit ($R^{M1}{}_{PEKK}$) and recurring ($R^P{}_{PEKK}$) includes recurring units ($R^{P1}{}_{PEKK}$), ($R^{P2}{}_{PEKK}$), and ($R^{P3}{}_{PEKK}$). Recurring units ($R^{M1}{}_{PEKK}$), ($R^{P1}{}_{PEKK}$), ($R^{P2}{}_{PEKK}$) and ($R^{P3}{}_{PEKK}$) are represented by the following formulae, respectively:

  (5)

—[—M$^{1*}_m$—O—]— and

  (6)

—[—M$^{1*}_p$—O—]—,

  (7)

—[—M$^{2*}_p$—O—]—,

  (8)

—[—M$^{3*}_p$—O—]—, where M$^{1*}_m$, M$^{1*}_p$, M$^{2*}_p$, and M$^{3*}_p$ are represented by the following formulae, respectively:

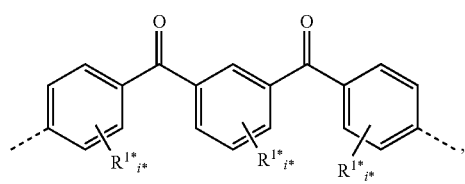 (9)

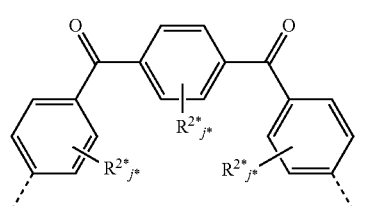 (10)

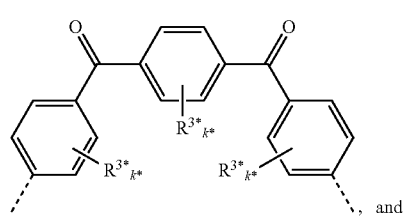 (11)

and

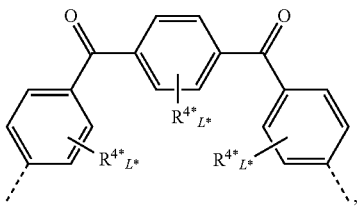 (12)

where R$^{1*}$, R$^{2*}$, R$^{3*}$ and R$^{4*}$, at each instance, is independently selected from the group consisting of an alkyl, an alkenyl, an alkynyl, an aryl, an ether, a thioether, a carboxylic acid, an ester, an amide, an imide, an alkali or alkaline earth metal sulfonate, an alkyl sulfonate, an alkali or alkaline earth metal phosphonate, an alkyl phosphonate, an amine, and a quaternary ammonium; and i*, j*, k* and L*, at each instance, is an independently selected integer ranging from 0 to 4. In some embodiments, each i*, j*, k* and L* is zero. In some embodiments, the total concentration of recurring unit ($R^{M1}{}_{PEKK}$) and recurring units ($R^{P1}{}_{PEKK}$), ($R^{P2}{}_{PEKK}$) and ($R^{P3}{}_{PEKK}$), is at least 50 mol %, at least 60 mol %, at least 70 mol %, at least 80 mol %, at least 90 mol %, at least 95 mol % or at least 99 mol %, or 100 mol %, relative to the total number of moles of recurring units ($R^M{}_{PEKK}$) and recurring units ($R^P{}_{PEKK}$). In some embodiments, ratio of the total number of moles of recurring units ($R^{P1}{}_{PEKK}$), ($R^{P2}{}_{PEKK}$), and ($R^{P3}{}_{PEKK}$) to the number of moles of recurring unit ($R^{M1}{}_{PEKK}$) is within the ranges above described with respect to recurring units ($R^M{}_{PEKK}$) and ($R^M{}_{PEKK}$).

As noted above, the PEKK polymers have unexpectedly lower Tg and unexpectedly high crystallinity. The PEKK polymers described herein can have a $\Delta T_g$ that is at least 1° C., where $$\Delta T_g = T_g^{(e)} - T_g \quad (E1)$$

$$T_g^{(e)} = T_g^{(0)} - \frac{m_T}{\eta_{inh}}, \quad (E2)$$

and where $T_g^{(e)}$ is the expected glass transition temperature and $\eta_{inh}$ is the inherent viscosity (in deciliters ("dL") per gram) of the PEKK polymer. The slope, $m_T$, and intercept, $T_g^{(0)}$, in equation E2 can be determined empirically by plotting Tg vs. $1/\eta_{inh}$ for various traditional PEKK polymers and fitting to the curve $T_g = T_g^{(0)} - m_T/\eta_{inh}$. For the PEKK polymers of interest herein, $T_g^{(0)} = 171°$ C. and $m_T = 5.53°$ C.*dL/g, as demonstrated in the examples below. In some embodiments, the PEKK polymers described herein have a $\Delta T_g$ that is at least 1.5° C. or at least 2° C. Additionally or alternatively, the PEKK polymers can have $\Delta T_g$ that is no more than 10° C., no more than 8° C., no more than 7° C., no more than 6° C., or no more than 5° C. Tg and $\eta_{inh}$ are measured as described in the Examples below.

Similarly, for PEKK polymers with a ratio of the number of moles of the at least one recurring units ($R^M{}_{PEKK}$) to the number of moles of recurring units ($R^M{}_{PEKK}$) of at least 1.9:1 to 3.0:1, preferably 2.1:1 to 2.7:1, the PEKK polymers can have a $\Delta(\Delta H_f)$ that is at least 1 joule per gram ("J/g"), where $$\Delta(\Delta H_F) = \Delta H_F - \Delta H_F^{(e)} \quad (E3)$$

$$\Delta H_F^{(e)} = \Delta H_F^{(0)} = m_H \eta_{inh} \quad (E4)$$

and where $\Delta H_F^{(e)}$ is the expected heat of fusion of the PEKK polymer. The slope, $m_H$, and intercept, $\Delta H_F^{(0)}$, can be determined empirically by plotting $\Delta H_f$ vs. $\eta_{inh}$ for various traditional PEKK polymers and fitting to the curve $\Delta H_F = \Delta H_F^{(0)} - m_H \eta_{inh}$. For the PEKK polymers of interest herein, $\Delta H_F^{(0)} = 46.85$ Joules/gram ("J/g") and $m_H = 12.6$ J/dL, as demonstrated in the examples below. In some embodiments, the PEKK polymers described herein have a $\Delta(\Delta H_f)$ that is at least 2, at least 3 J/g, at least 4 J/g, at least 5 J/g or at least 6 J/g. Additionally or alternatively, the PEKK polymers described herein can have a $\Delta(\Delta H_f)$ that is no more than 20 J/g or no more than 15 J/g. $\Delta H_f$ and $\eta_{inh}$ are measured as described in the Examples below.

The PEKK polymer can have a $T_m$ from 290° C. to 370° C., preferably from 300° C. to 360° C., more preferably from 320° C. to 350° C. The Tm is measured by DSC as described in the examples. The PEKK polymers can have a $\eta_{inh}$ from 0.40 dL/g to 1.50 dL/g, preferably from 0.50 dL/g to 1.40 dL/g, more preferably 0.60 dL/g to 1.2 dL/g. $\eta_{inh}$ is measured as described in the Examples below.

Additionally, as mentioned above, the PEKK polymers described herein have a significantly reduced residual chlorine concentration and increased thermal stability, relative to PEKK polymers synthesized using electrophilic synthesis routes. Accordingly, polymer compositions including the PEKK polymers can also have a significantly reduced residual chlorine concentration. In some embodiments, a polymer composition including the PEKK polymer can have a residual chlorine concentration of less than 900 ppm, less than 500 ppm, less than 400 ppm, less than 300 ppm, less than 250 ppm, less than 100 ppm, or less than 70 ppm. The residual chlorine concentration is measured as described in the Examples below. With respect to increased thermal stability, the PEKK polymers of interest herein have a 1 wt. % thermal decomposition temperature ("Td(1%)") of at least 490° C., preferably 495° C., more preferably 500° C. Td(1%) is measured as described in the Examples below.

Synthesis of Poly(Ether Ketone Ketone) Polymers

As mentioned above, it was found that the polymer synthesis methods described herein produces PEKK polymers having unexpectedly lower Tg and unexpectedly higher crystallinity, relative to traditional PEKK polymers. The synthesis approach involves the selective addition of monomers at distinct points along the synthesis pathway. More specifically, the synthesis approach contains a first heating; a first addition; and second heating. As discussed in detail below, essentially all of the monomer that form recurring units ($R^M_{PEKK}$) are added to the reaction mixture prior to or during the first addition and essentially all of the monomers that form the remainder of recurring units ($R^P_{PEKK}$) are added to the reaction mixture during the first addition or prior to the first addition, respectively.

In general, the PEKK polymers of interest herein include recurring units formed from the polycondensation of 1,3-bis(benzoyl) monomers and 1,4-bis(benzoyl) monomers having the following general formulae, respectively,

$$X^5\text{—}M_m\text{—}X^5, \text{ and} \quad (13)$$

$$X^6\text{—}M_p\text{—}X^6. \quad (14)$$

where $X^5$ is an —OH or halogen and $X^6$ is an —OH or halogen. As used herein, a halogen refers to any one of F, Cl, Br, and I. Preferably the halogen is F or Cl, more preferably the halogen is F. As used herein, a 1,3-bis(benzoyl) benzene monomer refers to a monomer represented by Formula (13) and 1,4-bis(benzoyl) benzene monomer refers to a monomer represented by Formula (14). Additionally, a bis(hydroxybenzoyl) benzene monomer refers to a monomer represented by Formula (13) or (14) where $X^5$ or $X^6$, respectively, is an —OH. A bis(halobenzoyl) benzene monomer refers to a monomer represented by Formula (13) or (14) where $X^5$ or $X^6$, respectively, is a halogen. For example, a 1,3-bis(hydroxybenzoyl) benzene monomer refers to a monomer of Formula (13) where $X^5$ is —OH. As another example, a 1,4-bis(halobenzoyl) benzene monomer refers to a monomer of Formula (14) where $X^6$ is a halogen.

Each recurring unit of the one or more recurring units ($R^M_{PEKK}$) and the one or more recurring units ($R^P_{PEKK}$) is formed from the polycondensation of a bis(hydroxybenzoyl) benzene monomer (a 1,3-bis(hydroxybenzoyl) benzene monomer or 1,4-bis(hydroxybenzoyl) benzene monomer) and a bis(halobenzoyl) benzene monomer (a 1,3-bis(halobenzoyl) benzene monomer or 1,4-bis(halobenzoyl) benzene monomer). Accordingly, the ratio of the total amount of bis(hydroxybenzoyl) benzene monomers to the total amount of bis(halobenzoyl) benzene monomers used in the synthesis reaction to form the recurring units ($R^M_{PEKK}$) and ($R^P_{PEKK}$) is substantially equimolar. As used herein, substantially equimolar means within 10% of equimolar, preferably 5% of equimolar, most preferably within 3% of equimolar. For example, the ratio of the number of moles of bis(hydroxybenzoyl) benzene monomer to the number of moles of the bis(halobenzoyl) benzene monomer is from 0.9:1 to 1:0.9, more preferably 0.95:1 to 1:0.95, most preferably from 0.97:1 to 1:0.97, and most preferably between 0.97:1 and 1.00:1.

Each recurring unit ($R^M_{PEKK}$) is formed from the polycondensation of two, distinct 1,3-bis(benzoyl) benzene monomers; or from the polycondensation of a 1,3-bis(benzoyl) benzene monomer and a 1,4-bis(benzoyl) benzene monomer. Analogously, each recurring unit ($R^P_{PEKK}$) is formed from the polycondensation of two, distinct 1,4-bis(benzoyl) benzene monomers; or from the polycondensation of a 1,3-bis(benzoyl) benzene monomer and a 1,4-bis(benzoyl) benzene monomer. For example, the polycondensation of a monomer according to the formula $X^5$—$M_m$—$X^5$ (1,3-bis(benzoyl) benzene) with a monomer according to the formula $X^6$—$M_p$—$X^6$ (1,4-bis(benzoyl) benzene), forms recurring units ($R^P_{PEKK}$) and ($R^M_{PEKK}$), where $X^5$ is an —OH or halogen and $X^6$ is a halogen if $X^5$ is an —OH and $X^6$ is an —OH if $X^5$ is a halogen. As another example, the polycondensation of a monomer according to the formula $X^5$—$M_m$—$X^5$ (1,3-bis(benzoyl) benzene) with a monomer according to the formula $X^7$—$M^*_m$—$X^7$ (1,3-bis(benzoyl) benzene) forms recurring units ($R^P_{PEKK}$), where $M^*_m$ is represented by a Formula (13), the same or distinct from $M_m$, and where $X^5$ is an —OH or halogen and $X^7$ is a halogen if $X^5$ is an —OH and $X^7$ is an —OH if $X^5$ is a halogen. As yet another example, the polycondensation of a monomer according to the formula $X^6$—$M_p$—$X^6$ (1,4-bis(benzoyl) benzene) with a monomer according to the formula X8—$M^*_p$—X8 (1,4-bis(benzoyl) benzene), forms recurring units ($R^M_{PEKK}$), where $M^*_p$ is represented by a Formula (14), the same or distinct from $M_p$, and where $X^6$ is an —OH or halogen and $X^8$ is a halogen if $X^6$ is an —OH and $X^8$ is an OH if $X^6$ is a halogen.

The PEKK polymers synthesis involves a multistep heating process including a first heating including heating a reaction mixture containing either a first monomer blend or a second monomer blend to a first temperature of from 200° C. to no more than 260° C.; a first addition including adding a second monomer blend or a first monomer blend to the reaction mixture, after the first heating; and a second heating including heating the reaction mixture to a temperature of from 300° C. to 340° C. More particularly, if the first heating includes heating a first monomer blend, the first addition includes heating the second monomer blend. Additionally, if the first heating includes heating a second monomer blend, the first addition includes adding the first monomer blend. Significantly, the first monomer blend contains substantially all of the monomers forming recurring units ($R^M_{PEKK}$) and the second monomer blend includes substantially of the monomers forming the remainder of recurring units ($R^P_{PEKK}$), as explained in detail below. Therefore, (i) the first monomer blend includes substantially all of the 1,3-bis(benzoyl) benzene monomers and 1,3-bis(benzoyl) benzene or 1,4-bis(benzoyl) benzene monomers that form recurring units ($R^M_{PEKK}$) of the PEKK and (ii) the second monomer blend includes substantially all of the 1,4-bis(benzoyl) benzene monomer that form substantially the all remaining recurring units ($R^{PP}_{PEKK}$) of the PEKK polymer. For clarity, reference to "monomer blend" without explicit indication of "first" or "second" refers to either the first monomer blend or second monomer blend.

With respect to the monomer blends, the first monomer blend contains at least $N^*_M$ moles of at least one 1,3-bis(benzoyl) benzene monomer, where $N^*_M$ is substantially equimolar to $N_M$, the total number of moles of recurring units ($R^M_{PEKK}$) in the PEKK polymer. Accordingly, $N^*_M$ is from $0.9N_M$ to $1.1N_M$, preferably from $0.95N_M$ to $1.05N_M$, and most preferably from $0.97N_M$ to $1.03N_m$. As noted above, recurring units ($R^M_{PEKK}$) can be formed from the polycondensation of two, distinct 1,3-bis(benzoyl) benzene monomers or from the polycondensation of a 1,3-bis(benzoyl) benzene monomer and a 1,4-bis(benzoyl) benzene monomer. Accordingly, the first monomer blend can also include 0 to $N^*_M$ moles of at least one first 1,4-bis(benzoyl) benzene monomer. In some embodiments, the first monomer blend comprises $0.90(N^*_p)$ to $1.10(N^*_p)$, preferably $0.95N^*p$ to $1.05N^*p$, more preferably $0.97N^*p$ to $1.03N^*p$ of the at least one first 1,4-bis(benzoyl) benzene monomer, where $N^*_p = N_m - (N^{OH}_m + N^X_m)$; $(N^{OH}_m + N^X_m) \leq N_m$, $N^{OH}_m$ is the number of moles of the at least one 1,3-bis(benzoyl) benzene monomers that are 1,3-bis(hydroxybenzoyl) benzene monomers; and $N^X_m$ is the number of moles of the at least one 1,3-bis(benzoyl) benzene monomers that are 1,3-bis(halobenzoyl) benzene monomers. In other words, where $N^*_p$ is zero, at least $N^*_M$ moles of the $N_M$ moles of recurring units ($R^M_{PEKK}$) are formed from the polycondensation of 1,3-bis(hydroxybenzoyl) benzene monomers and 1,3-bis(halobenzoyl) benzene monomers. On the other hand, when $N^*_p$ is greater than 0, at least some of the recurring units ($R^M_{PEKK}$) are formed from the polycondensation of 1,3-bis(benzoyl) benzene monomers and 1,4-bis(benzoyl) benzene monomers. Similarly, because each of the at least one 1,3-bis(benzoyl) benzene monomer and each of the at least one 1,4-bis(benzoyl) benzene monomer is either a bis(hydroxybenzoyl) benzene monomer or a bis(halobenzoyl) benzene monomer, the total number of moles bis(hydroxybenzoyl) benzene monomers is substantially equimolar to the total number of moles of bis(halobenzoyl) benzene monomers.

In some embodiments, the at least one 1,3-bis(benzoyl) benzene monomers can include a plurality of 1,3-bis(benzoyl) benzene monomers. In such embodiments, each 1,3-bis(benzoyl) benzene monomer is distinctly represented by a formula according to Formula (13) and the total concentration of 1,3-bis(benzoyl) benzene monomers is within the ranges described above. Similarly, the at least one 1,4-bis(benzoyl) benzene monomer can include a plurality of 1,4-bis(benzoyl) benzene monomers. In such embodiments, each 1,4-bis(benzoyl) benzene monomer is distinctly represented by a formula according to Formula (14) and the total concentration of 1,4-bis(benzoyl) benzene monomers is within the ranges described above.

The second monomer blend contains at least $0.45^*(N_P-N^*_p)$ moles to $0.55^*(N_P-N^*_p)$ moles, preferably $0.47^*(N_P-N^*_p)$ moles to $0.53^*(N_P-N^*_p)$ moles, more preferably $0.48^*(N_P-N^*p)$ moles to $0.52^*(N_P-N^*p)$ moles, of at least of at least one second 1,4-bis(benzoyl) benzene monomer and a substantially equimolar amount of at least one third 1,4-bis(benzoyl) benzene monomer, where Np is the total number of moles of recurring units ($R^P_{PEKK}$) in the PEKK polymer. As described above, each recurring unit ($R^P_{PEKK}$) is formed from the polycondensation of two, distinct 1,4-bis(benzoyl) benzene monomers or from the polycondensation of a 1,3-bis(benzoyl) benzene monomer and a 1,4-bis(benzoyl) benzene monomer. Accordingly, in some embodiments, $N^*_p$ moles of recurring unit ($R^P_{PEKK}$) can be formed from the polycondensation of the at least one first 1,3-bis(benzoyl) benzene monomer and at least one second 1,4-bis(benzoyl) benzene monomer in the first monomer blend, such that the 1,4-bis(benzoyl) benzene monomers of the second blend form the remainder of recurring unit ($R^P_{PEKK}$). Furthermore, because each 1,4-bis(benzoyl) benzene monomer is either a bis(hydroxybenzoyl) benzene monomer or a bis(halobenzoyl) benzene monomer, the total concentration of bis(hydroxybenzoyl) benzene monomers is substantially equimolar to the total concentration of bis(halobenzoyl) benzene monomers. In some embodiments, the at least one second 1,4-bis(benzoyl) benzene monomer can include a plurality of second 1,4-bis(benzoyl) benzene monomers. In such embodiments, each second 1,4-bis(benzoyl) benzene monomer is distinctly represented by a formula according to Formula (14) and the total concentration of the second 1,4-bis(benzoyl) benzene monomers is within the ranges described above. Similarly, in some embodiments, the at least one third 1,4-bis(benzoyl) benzene monomer can include a plurality of third 1,4-bis(benzoyl) benzene monomers. In such embodiments, each third 1,4-bis(benzoyl) benzene monomer is distinctly represented by a formula according to Formula (14) and the total concentration of the third 1,4-bis(benzoyl) benzene monomers is within the ranges described above.

As noted above, the first heating includes heating a reaction mixture containing either a first monomer blend or a second monomer blend to a first temperature of from 200° C. to no more than 260° C., preferably from 205 to 250° C., more preferably from 220 to 245° C. In addition to the monomer blend, the reaction mixture can further include a first alkali metal carbonate and a solvent. As used herein, an alkali metal refers to Li, Na, K, Rb, Cs and Fr. In some embodiments, the first alkali metal carbonate is selected from the group consisting of $Na_2CO_3$, $K_2CO_3$ and combinations thereof. In general, the total number of moles of alkali metal carbonates in the reaction mixture is substantially equimolar, with respect to the number of moles bis(hydroxybenzoyl) benzene monomers. In some embodiments, the number of moles of alkali metal carbonates is additionally at least 0.95, at least 1.02, at least 1.03, at least 1.035 or at least 1.04 times the number of moles of bis(hydroxybenzoyl) benzene monomers in the monomer blend. Additionally or alternatively, the number of moles of alkali metal carbonates is no more than 1.2, no more than 1.15, or no more than 1.10 times the number of moles of bis(hydroxybenzoyl) benzene monomers in the monomer blend. In embodiments in which the alkali metal carbonate comprises a mixture of $Na_2CO_3$ and $K_2CO_3$, the concentration of $K_2CO_3$ can be from 0.1 mol % to 10.0 mol %, 0.15 mol % to 5.0 mol % or from 0.2 mol % to 1.0 mol %, relative to the number of moles of bis(hydroxybenzoyl) benzene monomers in the monomer blend. In such embodiments, the total concentration of alkali metal carbonates is in the ranges described above. In embodiments in which the alkali metal carbonate includes $Na_2CO_3$, the $Na_2CO_3$ can meet the particle size distribution requirements as detailed in U.S. Pat. No. 9,175,136, to Louis, filed Oct. 23, 2009 and incorporated herein by reference.

The reaction mixture can further include a solvent. The solvent can include, but is not limited to, diphenyl sulfone, dibenzothiophene dioxide, benzophenone or combinations of any one or more thereof. Preferably, the solvent includes diphenyl sulfone. More preferably, the solvent includes at least 90 wt. %, at least 95 wt. %, at least 98 wt. % or at least 99 wt. % diphenyl sulfone. In some embodiments, the diphenyl sulfone is used in the synthesis method described herein includes limited amounts of impurities, as detailed in U.S. Pat. No. 9,133,111, to Louis et al., filed Apr. 7, 2014 and incorporated herein by reference.

In some embodiment, the monomers of monomer blend are added to the reaction mixture during the first heating. In one such embodiment, where the monomer blend is the first monomer blend, either the at least one 1,3-bis(benzoyl) benzene or the at least one first 1,4-bis(benzoyl) benzene is added to the reaction mixture when the temperature of the reaction mixture is below a first premixing temperature. The remaining monomer, respectively either the at least one first 1,4-bis(benzoyl) benzene monomer or the at least one 1,3-bis(benzoyl) benzene monomer is added when the temperature of the reaction mixture is above a second premixing temperature, greater or equal to the first premixing temperature. Analogously, in another embodiment, where the monomer blend is the second monomer blend, either the at least one second 1,4-bis(benzoyl) benzene monomer or the at least one third 1,4-bis(benzoyl) benzene monomer is added to the reaction mixture when the temperature of the reaction mixture is below the first premixing temperature. The remaining monomers, respectively either the at least one third 1,4-bis(benzoyl) benzene monomer or the at least one second 1,4-bis(benzoyl) benzene monomer is added when the temperature of the reaction mixture is above the second premixing temperature. In the embodiments described above, the first temperature is from 25° C. to 220° C. or from 180° C. to 220° C. Additionally, the second temperature is from 180° C. to 220° C.

In some embodiments, the first heating, heating can further include heating the reaction mixture to maintain its temperature within the first temperature range for a first period of time. In some embodiments, the first period of time can be from 5 minutes ("min.") to 300 min., from 7 min. to 240 min. or from 10 min. to 180 min or from 15 min to 120 min.

Subsequent to the first heating, the second monomer blend or first monomer blend is added to the reaction mixture in a first addition. As explained in detail above, if the first heating includes heating a first monomer blend, the first addition includes adding the second monomer blend. Similarly, if the first heating includes heating the second monomer blend, the first addition includes adding the first monomer blend. During the first addition, the temperature of the reaction mixture is maintained within the first temperature range. In some embodiments, the first addition can further include adding a second alkali metal carbonate to the reaction mixture, as described above with respect to the first alkali metal carbonate. For clarity, concentration ranges of the second alkali metal carbonate are the same from those of the first metal carbonate, while the exact values can be different for the first and second alkali metal carbonates. Preferably, at least one of the first or second alkali metal carbonates is a mixture of $Na_2CO_3$ and $K_2CO_3$. The addition of the second alkali metal carbonate can be simultaneous or subsequent to the first addition of the monomer blend. The first addition can range from 1 to 240 min, preferably 10 to 120 min, more preferably from 20 to 60 min. In other words, the component of the monomer blend can be added to the reaction mixture over a duration of from 1 to 240 min, preferably 10 to 120 min, more preferably from 20 to 60 min.

Subsequent to the first addition, the method for synthesizing the PEKK polymers can include a second heating that includes heating the reaction mixture to a second temperature that is from 300° C. to 340° C. In some such embodiments, the reaction mixture can be maintained with the second temperature range for a second period of time. The third period of time period can be from 0 to 240 min., from 0 to 180 min., or more 0 to 120 min.

In some embodiments, the PEKK polymer synthesis method further includes a second addition in which an end-capping agent is added to the reaction mixture. The end-capping agent controls the molecular weight of the PEKK polymer by terminating the polymerization reaction at a selected point during polymerization. In such embodiments, the second heating includes the second addition. Desirable end-capping agents include those represented by the following formula:

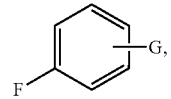

(15)

where g is —C(O)—Ar or S(O2)—Ar, and Ar is an arylene group. In some embodiments, the end-capping agent is an excess of one of the bis(halo benzoyl) benzene monomers of the at least on first or second 1,3-bis(halobenzoyl) benzene monomers or the at least one first, second or third 1,4-bis(halobenzoyl) benzene monomers. As used herein, and excess refers to amount of the 1,3-bis(halobenzoyl) benzene monomer or 1,4-bis(halobenzoyl) benzene monomer above the amount that would bring the total amount of the respective monomer in the first and second addition to at least 1.04 times an equimolar amount to the bis(hydroxybenzoyl) benzene monomer, preferably at least 1.05, more preferably at least 1.07.

In some embodiments, of the method for forming a PEKK polymer, one of the at least one first 1,3-bis(benzoyl) benzene monomer, one of the at least one first 1,4-bis(benzoyl) benzene monomer, one of the at least one second 1,4-bis (benzoyl) benzene monomer, and one of the the at least one third 1,4-bis(benzoyl) benzene monomer are represented by the following formulae, respectively :

(16)

(17)

(18)

(19)

wherein $X^1$ is —OH or a halogen; $X^2$ is a halogen if $X^1$ is an —OH and $X^2$ is an —OH if $X^1$ is a halogen; $X^3$ is an —OH or a halogen; and $X^4$ is an halogen if $X^3$ is an —OH and $X^4$ is an —OH if $X^3$ is a halogen. The at least one first 1,3-bis(benzoyl) benzene monomer and the least one first 1,4-bis(benzoyl) benzene monomer are in the first monomer blend and the at least one second 1,4-bis(benzoyl) benzene monomer and at least one third 1,4-bis(benzoyl) benzene monomer are in the second monomer blend. In such an embodiment, monomers $X^1$—$M^{*1}_m$—$X^1$ and $X^2$—$M^{*1}_p$—$X^2$ polycondense to form recurring units ($R^{M1}_{PEKK}$) and ($R^{P1}_{PEKK}$), respectively, and monomers $X^3$—$M^*_p$—$X^3$ and $X^4$—$M^*_p$—$X^4$ polycondense to form recurring units ($R^{P2}_{PEKK}$), and ($R^{P3}_{PEKK}$), respectively. In some such embodiments $X^1$ and $X^3$ are —OH. In some embodiments, each i*, j*, k* and L* are zero, such that recurring units ($R^{P1}_{PEKK}$), ($R^{P2}_{PEKK}$) and ($R^{P3}_{PEKKK}$) are identical.

Polymer Compositions, Shaped Articles, and Applications

The PEKK polymers described herein can be desirably used in polymer compositions and incorporated into shaped articles, including but not limited to mobile electronic devices, medical devices, and composite materials. Furthermore, the PEKK polymers, or compositions thereof, can also be desirably used in additive manufacturing application settings.

Polymer compositions including the PEKK polymers ("PEKK polymer compositions") can include a reinforcing filler. Reinforcing fillers include fibrous fillers and particulate fillers, distinct from the pigments described below. Particulate filers include mineral fillers including, but not limited to, talc, mica, kaolin, calcium carbonate, calcium silicate, and magnesium carbonate. Fibrous fillers include, but are not limited to, glass fiber, carbon fiber, synthetic polymeric fiber, aramid fiber, aluminum fiber, titanium fiber, magnesium fiber, boron carbide fiber, rock wool fiber, steel fiber, wollastonite. Preferably the reinforcing fillers is selected from mica, kaolin, calcium silicate, magnesium carbonate, glass fiber, carbon fiber, wollastonite, and any combination of one or more thereof.

Preferably, the filler is a fibrous filler. A particular class of fibrous fillers consists of whiskers, i.e. single crystal fibers made from various raw materials, such as $Al_2O_3$, SiC, BC, Fe and Ni. In one embodiment, the reinforcing filler is selected from wollastonite and glass fiber. Among fibrous fillers, glass fibers are preferred; they include chopped strand A-, E-, C-, D-, S-, T- and R-glass fibers, as described in chapter 5.2.3, p. 43-48 of Additives for Plastics Handbook, 2nd edition, John Murphy.

When the glass fibers has a circular cross-section, they preferably have an average glass fiber diameter of 3 to 30 μm and particularly preferred of 5 to 12 μm. Different sorts of glass fibers with a circular cross-section are available on the market depending on the type of the glass they are made of. One may notably cite glass fibers made from E- or S-glass.

In some embodiments, the reinforcing filler includes carbon fiber. As used herein, the term "carbon fiber" is intended to include graphitized, partially graphitized and ungraphitized carbon reinforcing fibers or a mixture thereof. Carbon fibers can advantageously be obtained by heat treatment and pyrolysis of different polymer precursors such as, for example, rayon, polyacrylonitrile (PAN), aromatic polyamide or phenolic resin; carbon fibers may also be obtained from pitchy materials. The term "graphite fiber" intends to denote carbon fibers obtained by high temperature pyrolysis (over 2000° C.) of carbon fibers, wherein the carbon atoms place in a way similar to the graphite structure. Carbon fibers are preferably selected from PAN-based carbon fibers, pitch based carbon fibers, graphite fibers, and any combination of one or more thereof.

The weight of the reinforcing filler is preferably below 80% wt., more preferably below 70% wt., even more preferably below 65% wt., based on the total weight of the composition.

In some embodiments, the PEKK polymer compositions can include, in addition or alternatively to the reinforcing filler one or more additional ingredients selected from the group consisting of (i) colorants (e.g. a dye); (ii) pigments (e.g., titanium dioxide, zinc sulfide and zinc oxide); (iii) light stabilizers (e.g. UV stabilizers); (iv) heat stabilizers; (v) antioxidants (e.g. organic phosphites and phosphonites); (vi) acid scavengers (vii) processing aids (viii) nucleating agents (ix) plasticizer, internal lubricants, and external lubricants; (x) flame retardants (xi) smoke-suppressing agents (x) antistatic agents (xi) anti-blocking agents (xii) conductivity additives (e.g. carbon black and carbon nanofibrils) (xiii) plasticizers; (xiv) flow modifiers; (xv) extenders; (xvi) metal deactivators and any combination of one or more thereof. In some embodiments, the total concentration of additional ingredients is below 20%, preferably below 10%, more preferably below 5% and even more preferably below 2%, based upon the total weight of the polymer composition.

In some embodiments, the composition comprises the PEKK polymer in combination with one or more than one additional polymeric components, such as polyarylether polymers different from PEKK polymer, including, but not limited to, poly(ether ether ketone) ("PEEK") polymers, poly(ether ketone) ("PEK") polymers, sulfone polymers, and polyaryl sulphide polymers. According to other embodiments, the PEKK polymer, as above detailed, is the only polymeric component in PEKK polymer composition. The expression 'polymeric components' is to be understood according to its usual meaning, i.e. encompassing compounds characterized by repeated linked units, having typically a molecular weight of 2,000 g/mol or more.

As noted above, the PEKK polymers synthesized as described herein have significantly reduced residual chlorine concentration, relative to corresponding PEKK polymer synthesized using an electrophilic route. The polymer compositions including the PEKK polymers synthesized as described herein can have a residual chlorine concentration of less than 900 ppm, less than 500 ppm, less than 400 ppm, less than 300 ppm, less than 250 ppm, less than 100 ppm, or less than 70 ppm.

The PEKK polymer compositions can be prepared by a variety of methods involving intimate admixing of the PEKK polymer, optionally the reinforcing filler and optionally the above described additional ingredient desired in the PEKK polymer composition, for example by dry blending, suspension or slurry mixing, solution mixing, melt mixing or a combination of dry blending and melt mixing.

Typically, the dry blending of PEKK polymer, as detailed above, preferably in powder state, optionally the reinforcing filler and optionally additional ingredients is carried out by using high intensity mixers, such as notably Henschel-type mixers and ribbon mixers so as to obtain a physical mixture, in particular a powder mixture of the at least one PEKK polymer, optionally the reinforcing filler and optionally additional ingredients. Alternatively, the intimate admixing of the PEKK polymer, optionally the reinforcing filler and optionally additional ingredients desired in the PEKK polymer composition, is carried out by tumble blending based on a single axis or multi-axis rotating mechanism so as to obtain a physical mixture.

Alternatively, the slurry mixing of the PEKK polymer, optionally the reinforcing filler and optionally additional ingredients is carried out by first slurrying the PEKK polymer, as above detailed, in powder form, optionally the reinforcing filler and optionally additional ingredients using an agitator in an appropriate liquid such as for example methanol, followed by filtering the liquid away, so as to obtain a powder mixture of the at least one PEKK polymer, optionally the reinforcing filler and optionally additional ingredients.

In another embodiment, the solution mixing of the PEKK polymer, as detailed above, optionally the reinforcing filler and optionally additional ingredients using an agitator in an appropriate solvent or solvent blends such as for example diphenyl sulfone, benzophenone, 4-chlorophenol, 2-chlorophenol, meta-cresol. Diphenyl sulfone is most preferred.

Following the physical mixing step by one of the aforementioned techniques, the physical mixture, in particular the obtained powder mixture, of the at least one PEKK polymer, optionally the reinforcing filler and optionally additional ingredients is typically melt fabricated by known methods in the art including notably melt fabrication processes such as compression molding, injection molding, extrusion and the like, to provide shaped articles.

So obtained physical mixture, in particular the obtained powder mixture can comprise the PEKK polymer, the reinforcing filler, as detailed above, and optionally, other ingredients in the weight ratios as above detailed, or can be a concentrated mixture to be used as masterbatch and diluted in further amounts of the PEKK polymer, as above detailed, the reinforcing filler, as detailed above, and optionally, other ingredients in subsequent processing steps. For example, the obtained physical mixture can be extruded into a stock shape like a slab or rod from which a final part can be machined. Alternatively, the physical mixture can be compression molded into a finished part or into a stock shape from which a finished part can be machined.

It is also possible to manufacture the composition of the invention by further melt compounding the powder mixture as above described. As said, melt compounding can be effected on the powder mixture as above detailed, or directly on the PEKK polymer, as above detailed, the reinforcing filler, as detailed above, and optionally, other ingredients. Conventional melt compounding devices, such as co-rotating and counter-rotating extruders, single screw extruders, co-kneaders, disc-pack processors and various other types of extrusion equipment can be used. Preferably, extruders, more preferably twin screw extruders can be used.

If desired, the design of the compounding screw, e.g. flight pitch and width, clearance, length as well as operating conditions will be advantageously chosen so that sufficient heat and mechanical energy is provided to advantageously fully melt the powder mixture or the ingredients as above detailed and advantageously obtain a homogeneous distribution of the different ingredients. Provided that optimum mixing is achieved between the bulk polymer and filler contents, it is advantageously possible to obtain strand extrudates of the PEKK polymer composition of the invention. Strand extrudates of the PEKK polymer composition can be chopped by means e.g. of a rotating cutting knife after some cooling time on a conveyer with water spray. Thus, for example a PEKK polymer composition which may be present in the form of pellets or beads can then be further used for the manufacture of shaped articles, notably of different shape and size.

The PEKK polymer compositions (or PEKK polymer) can be desirably incorporated into shaped articles. The shaped articles can be made from the PEKK polymer composition using any suitable melt-processing melt processing technique including, but not limited to, extrusion molding, injection molding, and compression molding. In some embodiments, the shaped articles are under the form of substantially bidimensional articles. Bidimensional articles include parts in which one dimension (thickness or height) is significantly less than the other two characterizing dimensions (width and length), for example, films and sheets. In some embodiments, the shaped article can be a coating. In some embodiments, the shaped articles are three-dimensional parts. Three-dimensional parts include parts that substantially extend in the three dimensions of space in similar manner, including under the form of complex geometries parts (e.g., concave or convex sections, possibly including undercuts, inserts, and the like).

In some embodiments, the shaped article is a component of a mobile electronic device. As used herein, a "mobile electronic device" refers to an electronic device that is transported and used in various locations. A mobile electronic device can include, but is not limited to, a mobile phone, a personal digital assistant ("PDA"), a laptop computer, a tablet computer, a wearable computing device (e.g., a smart watch and smart glasses), a camera, a portable audio player, a portable radio, a global position system receiver, and portable game console.

In some embodiments, at least a portion of a component of a mobile electronic device can be exposed to the external environment of the mobile electronic device (e.g., at least a portion of the component is in contact with the environment external to the mobile electronic device). For example, at least a portion of the component can form at least a portion of the external housing of the mobile electronic device. In some such embodiments, the component can be a full or partial "frame" around the periphery of the mobile electronic device, a beam in the form of a lattice work, or a combination thereof. As another example, at least a portion of the component can form at least a portion of an input device. In some such embodiments, a button of the electronic device can include the component. In some embodiments, the component can be fully enclosed by the electronic device (e.g., the component is not visible from an observation point external to the mobile electronic device).

In some embodiments, the PEKK polymers can be desirably incorporated into composites. In such embodiments, long fibers are solution, suspension or melt-impregnated with the PEKK polymer to form the composite. The long fibers generally have a length of at least 10 microns ("µm"). The fibers can be glass fibers or carbon fibers. In some embodiments, the composite can form a tape or woven fabric.

In some embodiments, the component can be of a mounting component with mounting holes or other fastening device, including but not limited to, a snap fit connector between itself and another component of the mobile electronic device, including but not limited to, a circuit board, a microphone, a speaker, a display, a battery, a cover, a housing, an electrical or electronic connector, a hinge, a radio antenna, a switch, or a switchpad. In some embodiments, the mobile electronic device can be at least a portion of an input device.

The components of the mobile electronic device can be fabricated from the PEKK polymer compositions using methods well known in the art. For example, the mobile electronic device components can be fabricated by methods including, but not limited to, injection molding, blow molding or extrusion molding. In some embodiments, PEKK polymer composition can be formed into pellets (e.g., having a substantially cylindrical body between two ends) by methods known in the art including, but not limited to, injection molding. In some such embodiments, mobile electronic device components can be fabricated from the pellets.

Additionally, due to the improved processability (e.g. lower Tg) and higher thermal stability, the PEKK polymers described herein can be desirably used in 3D printing (also known as additive manufacturing) fabrication technique such as fused filament fabrication (FFF) or selective laser sintering (SLS). Additive manufacturing involves the process of joining materials to make articles from 3D model data. The article is generally formed using layer by layer deposition. Commercially available 3D printing fabrication equipments of the FFF type include, as an example, the equipment manufactured by Stratasys, Inc. and sold under the Fortus® trademark. Examples of SLS based 3D printing equipment are available from EOS corporation such as the ones sold under the trade name EOSINT®. In such embodiments, an article can be formed by 3D printing the PEKK polymer (or PEKK polymer composition).

Additionally, due to the improved processability (e.g. lower Tg) and higher thermal stability, the PEKK polymers described herein can be desirably used in thermoforming.

In some embodiments, the shaped articles described herein are medical devices or components of medical devices. As used herein, a "medical device" is an article, instrument, apparatus or machine that is used in the prevention, diagnosis, or treatment of illness or disease, or for detecting, measuring, restoring, correcting, or modifying the structure or function of a human or animal body.

Material selection is critical for medical devices, particularly in instances where the material is implanted in, or comes into contact with, the body. There is a continued need for medical device materials that meet the particular requirements of the medical device in its application setting (e.g. wear resistance), and also reduce or prevent undesirable interactions with the body, such as, for example, the leaching of chemicals from the medical device into the body.

The PEKK polymers described herein may be particularly suitable for use in medical devices, for example, because of their higher purity as reflected in their reduced chlorine and metals content.

Medical devices can generally include surgical devices, non-surgical devices, prosthetic devices, implants, etc.

In some embodiments, the medical device including the PEKK polymers described herein is an implantable medical device (IMD). IMDs are medical devices designed to replace a missing biological structure, support a damaged biological structure, or enhance an existing biological structure in the body. Examples of IMDs include cranial implants such as craniomaxillo facial implants, spinal implants such as spinal cages and spinal disks, finger and toe implants, knee replacements, hip replacements such as acetabular caps, stents, heart valves, pacemakers, and hardware such as bone screws and plates. The medical devices may also include dental devices such as removable full and partial denture frames, crowns, bridges, artificial teeth, and implant bars.

EXAMPLES

The following Examples demonstrate the synthesis of PEKK, the rheological and thermal properties of the synthesized PEKK polymers.

The following materials and measurement methods were used, referenced in the individual examples below.

Poly(Ether Ether Ketone) Polymers

In the Examples, some of the PEKK polymers were commercially obtained, while other PEKK polymers were synthesized. Commercial PEKK polymer made by en electrophilic route was obtained from Cytec (Solvay Group) under the trade name Cypek® FC. Synthesized PEKK polymers were synthesized from the following monomers, as explained in further detail in each example below : 1,4-bis(4'-fluorobenzoyl)benzene (e.g. Formula (8) with each q equal to zero and $X^6$ is a fluorine); 1,3-bis(4'-fluorobenzoyl)benzene (e.g. Formula (7) with each p equal to zero and $X^5$ is a fluorine); 1,4-bis(4'-hydroxybenzoyl) benzene (e.g. Formula (8) with each q equal to zero and $X^6$ is —OH); and 1,3-bis(4'-hydroxybenzoyl)benzene (e.g. Formula (7) with each p equal to zero and $X^5$ is —OH). 1,4-bis(4'-fluorobenzoyl)benzene was prepared by Friedel-Crafts acylation of fluorobenzene according to Example 1 of U.S. Pat. No. 5,300,693 to Gilb et al. (filed Nov. 25, 1992 and incorporated herein by reference), purified by recrystallization in chlorobenzene to reach a GC purity of 99.9%. 1,3-bis(4'-fluorobenzoyl)benzene was procured from 3B Corp, USA and purified by recrystallization in chlorobenzene to reach a GC purity of 99.9%. 1,4-bis(4'-hydroxybenzoyl)benzene and 1,3-bis(4'-hydroxybenzoyl)benzene were produced by hydrolysis of 1,4-bis(4'-fluorobenzoyl)benzene and 1,3-bis(4'-fluorobenzoyl)benzene, respectively following the procedure described in Example 1 of U.S. Pat. No. 5,250,738 to Hackenbruch et al. (filed Feb. 24, 1992 and incorporated herein by reference) and purified by recrystallization in DMF/ethanol to reach a GC purity of 99.0%. Diphenyl sulfone (polymer grade) was commercial obtained from Proviron (99.8% pure). Other components used in the PEKK syntheses were sodium carbonate, light soda ash sold under the trade name Soda Solvay® L and commercially obtained from Solvay S.A.; and potassium carbonate (d90<45 µm), commercially obtained from Armand Products Company (USA). The sodium carbonate and potassium carbonate were dried before use. Lithium chloride (anhydrous powder) was also used in the PEKK syntheses and was commercially obtained from Acros Organics (Geel, Belgium).

Analytic Methods

The PEKK polymers were characterized using the following analytical methods. Inherent viscosity ("$\eta_{inh}$") was measured following ASTM D2857 at 30° C. on 0.5 wt./vol. % solutions in concentrated $H_2SO_4$ (96 wt. % minimum) using a Cannon-Fenske capillary, size 200.

The determination of chlorine concentration in PEKK was measure as follows. Using forceps, a clean, dry combustion boat was placed onto a microbalance, and the balance was zeroed. One to five milligrams ("mg") of polymer sample was weighed into a combustion boat and weight was recorded to 0.001 mg. The combustion boat and sample were placed in the introduction port of a ThermoGLAS 1200 Total Organic Halogen Analyzer, and the port was capped. The sample weight was entered into the sample weight field on the instrument computer. The sample analysis cycle was then started. The sample was burned in a mixture of argon and oxygen and the combustion products were passed through concentrated sulfuric acid scrubber to remove moisture and byproduct. Hydrogen chloride and oxychlorides from the combustion process were absorbed into the cell acetic acid solution from the gas stream. Chloride entered the cell was titrated with silver ions generated coulometrically. Percent chlorine in the sample was calculated from the integrated current and the sample weight.

The temperature at 1% weight loss, Td (1%), was measured by thermal gravimetric analysis ("TGA") according to the ASTM D3850. TGA was performed on a TA Instruments TGA Q500 from 30° C. to 800° C. under nitrogen (60 mL/min) at a heating rate of 10° C./minute.

Determination of the glass transition temperature, melting temperature and heat of fusion were measured as follows. The glass transition temperature Tg (mid-point) and the melting temperature Tm were determined on the 2nd heat scan in differential scanning calorimeter (DSC) according to ASTM D3418-03, E1356-03, E793-06, E794-06. Details of the procedure as used in this invention are as follows: a TA Instruments DSC Q20 was used with nitrogen as carrier gas (99.998% purity, 50 mL/min). Temperature and heat flow calibrations were done using indium. Sample size was 5 to 7 mg. The weight was recorded ±0.01 mg. The heat cycles were: 1st heat cycle—30.00° C. to 400.00° C. at 20.00° C./min, isothermal at 400.00° C. for 1 min; 1st cool cycle—400.00° C. to 30.00° C. at 20.00° C./min, isothermal for 1 min; and 2nd heat cycle—30.00° C. to 400.00° C. at 20.00° C./min, isothermal at 400.00° C. for 1 min.

The melting temperature, Tm, was determined as the peak temperature of the melting endotherm on the 2nd heat scan. The enthalpy of fusion was determined on the 2nd heat scan. The enthalpy of fusion was determined on the 2nd heat scan and was taken as the area over a linear baseline drawn from above the Tg to a temperature above end of the endotherm.

The melt viscosity ("MV") was measured using a capillary rheometer according to ASTM D3835. Readings were taken after 10 minute dwell time at 380° C. and a shear rate of 46.3 s$^{-1}$ using a die with the following characteristics: diameter=1.016 mm, length=20.32 mm, cone angle=120°

The tensile properties were determined as follows. A 102 mm×102 mm×3.2 mm plaque was prepared from the polymer by compression molding under the following conditions : preheat at 377° C.; 377° C./15 minutes, 2000 kg-f; 377° C./2 minutes, 2700 kilograms force ("kg-f"); and cool down to 30° C. over 40 minutes, 2000 kg-f. The 102 mm×102 mm×3.2 mm compression molded plaques were machined into Type V ASTM tensile specimens and these specimens of the various polymer compositions were subjected to tensile testing according to ASTM method D638 at 0.05 inch/minute room temperature (i.e. 23° C.) on 5 specimens. The crystallinity level of specimens taken from the molded plaques was determined by DSC, following the same method as above but by measuring the melting endotherm on the 1$^{st}$ heat scan, assuming 130 J/g for 100% crystalline material.

In the examples below, the T/I ratio refers to the ratio of the number of moles of recurring unit ($R^P_{PEKK}$) to the number of moles of recurring unit ($R^M_{PEKK}$).

Counter Example 1: Analysis of PEKK with Synthesized Using an Electrophilic Synthesis Route The following example demonstrates the analysis of PEKK synthesized using an electrophilic synthesis route. Cypek® FC was analyzed as described above, and the results are displayed in Tables 1 and 2.

Counter Example 2: Synthesis and Analysis of PEKK with 70/30 T/I Ratio

This example demonstrates the synthesis of a PEKK polymer via a traditional nucleophilic synthetic route.

A PEKK sample was prepared according the method described in CN1974631, filed Nov. 21, 2006. To perform the synthesis, 249.93 g of diphenyl sulfone, 39.790 g of 1,4-bis(4'-hydroxybenzoyl)benzene, 16.115 g of 1,4-bis(4'-fluorobenzoyl)benzene, 24.172 g of 1,3-bis(4'-fluorobenzoyl)benzene and 13.646 g of Na$_2$CO$_3$ were added to a 500 milliliter ("mL") 4-neck reaction flask. The reaction flask was fitted with a stirrer, a N$_2$ inlet tube, a Claisen adapter with a thermocouple plunging in the reaction medium, and a Dean-Stark trap with a condenser and a dry ice trap. The flask content was evacuated under vacuum and then filled with high purity nitrogen (containing less than 10 ppm O$_2$). The reaction mixture was then placed under a constant nitrogen purge (60 mL/min.).

The reaction mixture was heated to 120° C., then from 120° C. to 160° C. at 2° C./min. The mixture was then held at 160° C. for 1 h, heated up to 210° C. at 5° C./min and held at 210° C. for 1 h. The mixture was then heated up to 250° C. at 5° C./min and held at 250° C. for 1 h. The mixture was then heated up to 290° C. at 10° C./min and held at 290° C. for 2 h. The mixture was heated up to 310° C. at 10° C./min and held at 310° C. for 3 h. The contents of the reaction flask were then poured into a stainless steel pan and cooled. The solid was broken up and ground in an attrition mill through a 2 mm screen. Diphenyl sulfone and salts were extracted from the mixture with acetone and water at pH between 1 and 12. The powder was then removed from the reactor and dried at 120° C. under vacuum for 12 hours yielding 68 g of an off-white/yellow powder. Recurring units ($R^{PM}_{PEKK}$) and ($R^{PP}_{PEKK}$) synthesized PEKK polymer can be described as follows:

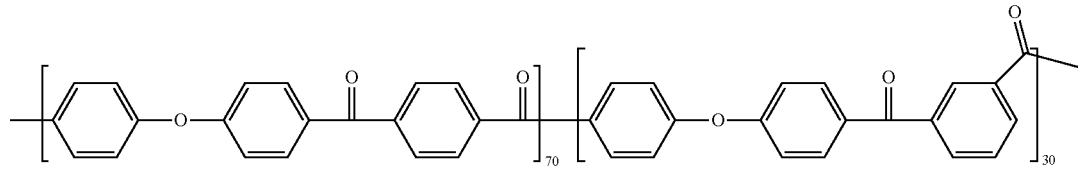

The ratio of recurring units ($R^{PP}_{PEKK}$) and ($R^{PM}_{PEKK}$) was 70/30 (as noted by the subscripts on the respective repeat units).

The PEKK polymer was analyzed as described above, and the results are displayed in Tables 1 and 2.

Counter Example 3: Synthesis and Analysis of PEKK with 72/28 T/I ratio

This example demonstrates the synthesis of a PEKK polymer via a traditional nucleophilic synthetic route.

To synthesize the PEKK polymer, 102.27 g of diphenyl sulfone, 31.832 g of 1,4-bis(4'-hydroxybenzoyl)benzene, 14.281 g of 1,4-bis(4'-fluorobenzoyl)benzene and 18.175 g of 1,3-bis(4'-fluorobenzoyl)benzene were added to a 500 mL 4-neck reaction flask. The flask was fitted with a stirrer, a $N_2$ inlet tube, a Claisen adapter with a thermocouple plunging in the reaction medium, and a Dean-Stark trap with a condenser and a dry ice. The flask content was evacuated under vacuum and then filled with high purity nitrogen (containing less than 10 ppm $O_2$). The reaction mixture was then placed under a constant nitrogen purge (60 mL/min).

The reaction mixture was heated slowly to 180° C. At 180° C., 11.023 g of $Na_2CO_3$ were added via a powder dispenser to the reaction mixture over 30 minutes. At the end of the addition, the reaction mixture was heated to 310° C. at 1° C./minute. After 152 minutes at 310° C., 0.645 g of 1,4-bis(4'-fluorobenzoyl)benzene were added to the reaction mixture while keeping a nitrogen purge on the reactor. After 5 minutes, 0.424 g of lithium chloride were added to the reaction mixture. 10 minutes later, another 0.323 g of 1,4-bis(4'-fluorobenzoyl)benzene were added to the reaction flask and the reaction mixture was kept at temperature for 15 minutes.

The content of the reaction flask was then poured from the reactor into a stainless steel pan and cooled. The solid was broken up and ground in an attrition mill through a 2 mm screen. Diphenyl sulfone and salts were extracted from the mixture with acetone and water at pH between 1 and 12. The powder was then removed from the reaction flask and dried at 120° C. under vacuum for 12 hours yielding 52 g of an off-white/yellow powder. The final polymer had a T/I ratio of 72/28.

The PEKK polymer was analyzed as described above, and the results are displayed in Tables 1 and 2.

Counter Example 4: Synthesis and Analysis of PEKK with 72/28 T/I ratio

This example demonstrates the synthesis of a PEKK polymer via a traditional nucleophilic synthetic route.

To synthesize the PEKK polymer, 102.27 g of diphenyl sulfone, 31.832 g of 1,4-bis(4'-hydroxybenzoyl)benzene and 11.023 g of $Na_2CO_3$ were added to a 500 mL 4-neck reaction flask. The flask was fitted with a stirrer, a $N_2$ inlet tube, a Claisen adapter with a thermocouple plunging in the reaction medium, and a Dean-Stark trap with a condenser and a dry ice trap. The flask content was evacuated under vacuum and then filled with high purity nitrogen (containing less than 10 ppm $O_2$). The reaction mixture was then placed under a constant nitrogen purge (60 mL/min).

The reaction mixture was heated slowly to 180° C. At 180° C., a mixture of 14.281 g of 1,4-bis(4'-fluorobenzoyl)benzene and 18.175 g of 1,3-bis(4'-fluorobenzoyl)benzene was added via a powder dispenser to the reaction mixture over 30 minutes. At the end of the addition, the reaction mixture was heated to 310° C. at 1° C./minute. After 193 minutes at 310° C., 0.645 g of 1,4-bis(4'-fluorobenzoyl)benzene were added to the reaction mixture while keeping a nitrogen purge on the reactor. After 5 minutes, 0.427 g of lithium chloride were added to the reaction mixture. 10 minutes later, another 0.323 g of 1,4-bis(4'-fluorobenzoyl)benzene were added to the reaction flask and the reaction mixture was kept at temperature for 15 minutes.

The contents of the reaction flask were then poured from the reactor into a stainless steel pan and cooled. The solid was broken up and ground in an attrition mill through a 2 mm screen. Diphenyl sulfone and salts were extracted from the mixture with acetone and water at pH between 1 and 12. The powder was then removed from the reactor and dried at 120° C. under vacuum for 12 hours yielding 57 g of an off-white/yellow powder. The final polymer had a T/I ratio of 72/28.

The PEKK polymer was analyzed as described above, and the results are displayed in Tables 1 and 2.

Counter Example 5: Synthesis and Analysis of PEKK with 72/28 T/I Ratio

This example demonstrates the synthesis of PEKK polymers via a traditional nucleophilic synthetic route.

To synthesize the PEKK polymer, 102.27 g of diphenyl sulfone, 22.919 g of 1,4-bis(4'-hydroxybenzoyl)benzene, 8.913 g of 1,3-bis(4'-hydroxybenzoyl)benzene and 11.023 g of $Na_2CO_3$ were added to a 500 mL 4-neck reaction flask. The reaction flask was fitted with a stirrer, a $N_2$ inlet tube, a Claisen adapter with a thermocouple plunging in the reaction medium, and a Dean-Stark trap with a condenser and a dry ice trap. The flask content was evacuated under vacuum and then filled with high purity nitrogen (containing less than 10 ppm $O_2$). The reaction mixture was then placed under a constant nitrogen purge (60 mL/min).

The reaction mixture was heated slowly to 180° C. At 180° C., a mixture of 23.368 g of 1,4-bis(4'-fluorobenzoyl)benzene and 9.088 g of 1,3-bis(4'-fluorobenzoyl)benzene was added via a powder dispenser to the reaction mixture over 30 minutes. At the end of the addition, the reaction mixture was heated to 310° C. at 1° C./minute. After 92 minutes at 310° C., 0.645 g of 1,4-bis(4'-fluorobenzoyl)benzene were added to the reaction mixture while keeping a nitrogen purge on the reactor. After 5 minutes, 0.427 g of lithium chloride were added to the reaction mixture. 10 minutes later, another 0.323 g of 1,4-bis(4'-fluorobenzoyl)benzene were added to the reaction flask and the reaction mixture was kept at temperature for 15 minutes.

The contents of the reaction flask were then poured from the reactor into a stainless steel pan and cooled. The solid was broken up and ground in an attrition mill through a 2 mm screen. Diphenyl sulfone and salts were extracted from the mixture with acetone and water at pH between 1 and 12. The powder was then removed from the reactor and dried at 120° C. under vacuum for 12 hours yielding 53 g of an off-white/yellow powder. The final polymer had a T/I ratio of 72/28.

The PEKK polymer was analyzed as described above, and the results are displayed in Tables 1 and 2.

Counter Example 6: Synthesis and Analysis of PEKK with 72/28 T/I Ratio

This example demonstrates the synthesis of PEKK polymers via a traditional nucleophilic synthetic route.

To synthesis the PEKK polymer, 102.27 g of diphenyl sulfone, 14.006 g of 1,4-bis(4'-hydroxybenzoyl)benzene, 17.826 g of 1,3-bis(4'-hydroxybenzoyl)benzene and 11.023 g of $Na_2CO_3$ were added to a 500 mL 4-neck reaction flask. The reaction flask was fitted with a stirrer, a $N_2$ inlet tube, a Claisen adapter with a thermocouple plunging in the reaction medium, and a Dean-Stark trap with a condenser and a dry ice trap. The flask content was evacuated under vacuum and then filled with high purity nitrogen (containing less than 10 ppm $O_2$). The reaction mixture was then placed under a constant nitrogen purge (60 mL/min).

The reaction mixture was heated slowly to 180° C. At 180° C., 32.456 g of 1,4-bis(4'-fluorobenzoyl)benzene were added via a powder dispenser to the reaction mixture over 30 minutes. At the end of the addition, the reaction mixture was heated to 310° C. at 1° C./minute. After 92 minutes at 310° C., 0.645 g of 1,4-bis(4'-fluorobenzoyl)benzene were added to the reaction mixture while keeping a nitrogen purge on the reactor. After 5 minutes, 0.427 g of lithium chloride were added to the reaction mixture. 10 minutes later, another 0.323 g of 1,4-bis(4'-fluorobenzoyl)benzene were added to the reaction mixture and the reaction mixture was kept at temperature for 15 minutes.

The contents of the reaction flask were then poured from the reactor into a stainless pan and cooled. The solid was broken up and ground in an attrition mill through a 2 mm screen. Diphenyl sulfone and salts were extracted from the mixture with acetone and water at pH between 1 and 12. The powder was then removed from the reactor and dried at 120° C. under vacuum for 12 hours yielding 53 g of an off-white/yellow powder. The final polymer had a T/I ratio of 72/28.

The PEKK polymer was analyzed as described above, and the results are displayed in Tables 1 and 2.

Counter Example 7: Synthesis and Analysis of PEKK with 71/29 T/I Ratio

This example demonstrates the synthesis of PEKK polymers via a traditional nucleophilic synthetic route.

To synthesize the PEKK polymer, 102.27 g of diphenyl sulfone, 13.369 g of 1,4-bis(4'-hydroxybenzoyl)benzene, 18.463 g of 1,3-bis(4'-hydroxybenzoyl)benzene, 32.617 g of 1,4-bis(4'-fluorobenzoyl)benzene were added to a 500 mL 4-neck reaction flask. The reaction flask was fitted with a stirrer, a N2 inlet tube, a Claisen adapter with a thermocouple plunging in the reaction medium, and a Dean-Stark trap with a condenser and a dry ice trap. The flask content was evacuated under vacuum and then filled with high purity nitrogen (containing less than 10 ppm $O_2$). The reaction mixture was then placed under a constant nitrogen purge (60 mL/min).

The reaction mixture was heated slowly to 180° C. At 180° C., 11.023 g of Na2CO3 were added via a powder dispenser to the reaction mixture over 30 minutes. At the end of the addition, the reaction mixture was heated to 320° C. at 1° C./minute. After 140 minutes at 320° C., 1.290 g of 1,4-bis(4'-fluorobenzoyl)benzene were added to the reaction mixture while keeping a nitrogen purge on the reactor. After 5 minutes, 0.427 g of lithium chloride were added to the reaction mixture. 10 minutes later, another 0.323 g of 1,4-bis(4'-fluorobenzoyl)benzene were added to the reaction vessel and the reaction mixture was kept at temperature for 15 minutes.

The contents of the reaction vessel were then poured from the reactor into a stainless steel pan and cooled. The solid was broken up and ground in an attrition mill through a 2 mm screen. Diphenyl sulfone and salts were extracted from the mixture with acetone and water at pH between 1 and 12. The powder was then removed from the reactor and dried at 120° C. under vacuum for 12 hours yielding 53 g of an off-white/yellow powder. The final polymer had a T/I ratio of 71/29.

The PEKK polymer was analyzed as described above, and the results are displayed in Tables 1 and 2.

Counter Example 8: Synthesis and Analysis of PEKK with 70/30 T/I Ratio

This example demonstrates the synthesis of PEKK polymers via a traditional nucleophilic synthetic route.

To synthesis the PEKK polymers, 127.83 g of diphenyl sulfone, 39.790 g of 1,4-bis(4'-hydroxybenzoyl)benzene, 16.115 g of 1,4-bis(4'-fluorobenzoyl)benzene, 24.172 g of 1,3-bis(4'-fluorobenzoyl)benzene, 13.646 g of Na2CO3 and 7.774 g of $K_2CO_3$ were added to a 500 mL 4-neck reaction flask. The reaction flask was fitted with a stirrer, a $N_2$ inlet tube, a Claisen adapter with a thermocouple plunging in the reaction medium, and a Dean-Stark trap with a condenser and a dry ice. The flask content was evacuated under vacuum and then filled with high purity nitrogen (containing less than 10 ppm $O_2$). The reaction mixture was then placed under a constant nitrogen purge (60 mL/min).

The reaction mixture was heated slowly to 200° C., then to 320° C. at 1° C./minute. After 33 minutes at 310° C., the reactor content was poured from the reactor into a stainless steel pan and cooled. The solid was broken up and ground in an attrition mill through a 2 mm screen. Diphenyl sulfone and salts were extracted from the mixture with acetone and water at pH between 1 and 12. The powder was then removed from the reaction vessel and dried at 120° C. under vacuum for 12 hours yielding 52 g of an off-white/yellow powder. The final polymer had a T/I ratio of 70/30.

The PEKK polymer was analyzed as described above, and the results are displayed in Tables 1 and 2.

Counter Example 9: Synthesis and Analysis of PEKK with 70/30 T/I Ratio

This example demonstrates the synthesis of PEKK polymers via a traditional nucleophilic synthetic route.

To synthesis the PEKK polymer, 127.83 g of diphenyl sulfone, 39.790 g of 1,4-bis(4'-hydroxybenzoyl)benzene, 13.646 g of Na2CO3 and 7.774 g of $K_2CO_3$ were added to a 500 mL 4-neck reaction flask. The reaction flask was fitted with a stirrer, a $N_2$ inlet tube, a Claisen adapter with a thermocouple plunging in the reaction medium, and a Dean-Stark trap with a condenser and a dry ice trap. The flask content was evacuated under vacuum and then filled with high purity nitrogen (containing less than 10 ppm $O_2$). The reaction mixture was then placed under a constant nitrogen purge (60 mL/min).

The reaction mixture was heated slowly to 200° C. At 200° C., a mixture of 16.115 g of 1,4-bis(4'-fluorobenzoyl)benzene and 24.172 g of 1,3-bis(4'-fluorobenzoyl)benzene was added via a powder dispenser to the reaction mixture over 30 minutes. At the end of the addition, the reaction mixture was heated to 320° C. at 1° C./minute. After 21 minutes at 310° C., the contents of the reaction flask were poured into a stainless steel pan and cooled. The solid was broken up and ground in an attrition mill through a 2 mm screen. Diphenyl sulfone and salts were extracted from the mixture with acetone and water at pH between 1 and 12. The powder was then removed from the reactor and dried at 120° C. under vacuum for 12 hours yielding 52 g of an off-white/yellow powder. The final polymer had a T/I ratio of 70/30.

The PEKK polymer was analyzed as described above, and the results are displayed in Tables 1 and 2.

Example 10: Synthesis and Analysis of PEKK with 71/29 T/I Ratio

This example demonstrates the synthesis and analysis of PEKK using a nucleophilic synthetic route.

102.27 g of diphenyl sulfone, 18.463 g of 1,3-bis(4'-hydroxybenzoyl)benzene, 6.363 g of Na2CO3 and 0.040 g of K2CO3 were added to a 500 mL 4-neck reaction flask. The Flask was fitted with a stirrer, a $N_2$ inlet tube, a Claisen adapter with a thermocouple plunging in the reaction medium, and a Dean-Stark trap with a condenser and a dry ice trap. The flask content was evacuated under vacuum and then filled with high purity nitrogen (containing less than 10 ppm O2). The reaction mixture was then placed under a constant nitrogen purge (60 mL/min).

The reaction mixture was heated slowly to 180° C. At 180° C., 18.918 g of 1,4-bis(4'-fluorobenzoyl)benzene, were added via a powder dispenser to the reaction mixture over 30 minutes. At the end of the addition, the reaction mixture was heated to 220° C. at 1° C./minute.

At 220° C., a mixture of 13.699 g of 1,4-bis(4'-fluorobenzoyl)benzene, 13.370 g of 1,4-bis(4'-hydroxybenzoyl)benzene, 4.607 g of $Na_2CO_3$ and 0.029 g of K2CO3 was added slowly to the reaction mixture over 30 minutes.

At the end of the addition, the reaction mixture was heated to 320° C. at 1° C./minute. After 5 minutes at 320° C., 1.290 g of 1,4-bis(4'-fluorobenzoyl)benzene were added to the reaction mixture while keeping a nitrogen purge on the reactor. After 5 minutes, 0.427 g of lithium chloride were added to the reaction mixture. 10 minutes later, another 0.323 g of 1,4-bis(4'-fluorobenzoyl)benzene were added to the reaction flask and the reaction mixture was kept at temperature for 15 minutes.

The contents of the reactor were then poured into a stainless steel pan and cooled. The solid was broken up and ground in an attrition mill through a 2 mm screen. Diphenyl sulfone and salts were extracted from the mixture with acetone and water at pH between 1 and 12. The powder was then removed from the reactor and dried at 120° C. under vacuum for 12 hours yielding 52 g of an off-white/yellow powder. The final polymer had a T/I ratio of 71/29.

The PEKK polymer was analyzed as described above, and the results are displayed in Tables 1 and 2.

Example 11: Synthesis and Characterization of PEKK with 71/29 T/I Ratio

This example demonstrates the synthesis and analysis of PEKK using a nucleophilic synthetic route.

102.27 g of diphenyl sulfone, 18.463 g of 1,3-bis(4'-hydroxybenzoyl)benzene, 6.363 g of $Na_2CO_3$ and 0.016 g of $K_2CO_3$ were added to a 500 mL 4-neck reaction flask. The flask was fitted with a stirrer, a N2 inlet tube, a Claisen adapter with a thermocouple plunging in the reaction medium, and a Dean-Stark trap with a condenser and a dry ice trap.

The flask content was evacuated under vacuum and then filled with high purity nitrogen (containing less than 10 ppm O2). The reaction mixture was then placed under a constant nitrogen purge (60 mL/min).

The reaction mixture was heated slowly to 180° C. At 180° C., 18.918 g of 1,4-bis(4'-fluorobenzoyl)benzene, were added via a powder dispenser to the reaction mixture over 30 minutes. At the end of the addition, the reaction mixture was heated to 220° C. at 1° C./minute.

At 220° C., a mixture of 13.699 g of 1,4-bis(4'-fluorobenzoyl)benzene, 13.370 g of 1,4-bis(4'-hydroxybenzoyl)benzene, 4.607 g of Na2CO3 and 0.012 g of K2CO3 was added slowly to the reaction mixture over 30 minutes.

At the end of the addition, the reaction mixture was heated to 320° C. at 1° C./minute. After 30 minutes at 320° C., 1.290 g of 1,4-bis(4'-fluorobenzoyl)benzene were added to the reaction mixture while keeping a nitrogen purge on the reactor. After 5 minutes, 0.427 g of lithium chloride were added to the reaction mixture. 10 minutes later, another 0.323 g of 1,4-bis(4'-fluorobenzoyl)benzene were added to the reaction flask and the reaction mixture was kept at temperature for 15 minutes.

The contents of the reaction flask were then poured into a stainless steel pan and cooled. The solid was broken up and ground in an attrition mill through a 2 mm screen. Diphenyl sulfone and salts were extracted from the mixture with acetone and water at pH between 1 and 12. The powder was then removed from the reaction flaks and dried at 120° C. under vacuum for 12 hours yielding 52 g of an off-white/yellow powder. The final polymer had a T/I ratio of 71/29.

The PEKK polymer was analyzed as described above, and the results are displayed in Tables 1 and 2.

Example 12: Synthesis and Analysis of PEKK with 71/29 T/I Ratio

This example demonstrates the synthesis and analysis of PEKK using a nucleophilic synthetic route.

102.27 g of diphenyl sulfone, 18.463 g of 1,3-bis(4'-hydroxybenzoyl)benzene, 6.332 g of Na2CO3 and 0.069 g of K2CO3 were added to a 500 mL 4-neck reaction flask fitted with a stirrer, a N2 inlet tube, a Claisen adapter with a thermocouple plunging in the reaction medium, and a Dean-Stark trap with a condenser and a dry ice trap. The flask content was evacuated under vacuum and then filled with high purity nitrogen (containing less than 10 ppm O2). The reaction mixture was then placed under a constant nitrogen purge (60 mL/min).

The reaction mixture was heated slowly to 200° C. At 200° C., 18.918 g of 1,4-bis(4'-fluorobenzoyl)benzene, were added via a powder dispenser to the reaction mixture over 30 minutes. At the end of the addition, the reaction mixture was heated to 240° C. at 1° C./minute.

At 240° C., a mixture of 13.699 g of 1,4-bis(4'-fluorobenzoyl)benzene, 13.370 g of 1,4-bis(4'-hydroxybenzoyl)benzene and 4.586 g of Na2CO3 was added slowly to the reaction mixture over 30 minutes.

At the end of the addition, the reaction mixture was heated to 320° C. at 1° C./minute. After 43 minutes at 320° C., 2.579 g of 1,4-bis(4'-fluorobenzoyl)benzene were added to the reaction mixture while keeping a nitrogen purge on the reactor. After 5 minutes, 0.424 g of lithium chloride were added to the reaction mixture. 10 minutes later, another 0.323 g of 1,4-bis(4'-fluorobenzoyl)benzene were added to the reaction flask and the reaction mixture was kept at temperature for 15 minutes.

The contents of the reaction flask were then poured into a stainless steel pan and cooled. The solid was broken up and ground in an attrition mill through a 2 mm screen. Diphenyl sulfone and salts were extracted from the mixture with acetone and water at pH between 1 and 12. The powder was then removed from the reactor and dried at 120° C. under vacuum for 12 hours yielding 52 g of an off-white/yellow powder. The final polymer had a T/I ratio of 71/29.

The PEKK polymer was analyzed as described above, and the results are displayed in Tables 1 and 2.

Example 13: Synthesis and Analysis of PEKK with 71/29 T/I Ratio

This example demonstrates the synthesis and analysis of PEKK using a nucleophilic synthetic route.

102.27 g of diphenyl sulfone, 18.463 g of 1,3-bis(4'-hydroxybenzoyl)benzene, 6.344 g of $Na_2CO_3$ and 0.062 g of $K_2CO_3$ were added to a 500 mL 4-neck reaction flask fitted with a stirrer, a $N_2$ inlet tube, a Claisen adapter with a thermocouple plunging in the reaction medium, and a Dean-Stark trap with a condenser and a dry ice. The flask content was evacuated under vacuum and then filled with high purity nitrogen (containing less than 10 ppm O2). The reaction mixture was then placed under a constant nitrogen purge (60 mL/min).

The reaction mixture was heated slowly to 200° C. At 200° C., 18.918 g of 1,4-bis(4'-fluorobenzoyl)benzene, were added via a powder dispenser to the reaction mixture over 30 minutes. At the end of the addition, the reaction mixture was heated to 240° C. at 1° C./minute.

At 240° C., a mixture of 13.699 g of 1,4-bis(4'-fluorobenzoyl)benzene, 13.370 g of 1,4-bis(4'-hydroxybenzoyl)benzene and 4.595 g of $Na_2CO_3$ was added slowly to the reaction mixture over 30 minutes.

At the end of the addition, the reaction mixture was heated to 320° C. at 1° C./minute. After 221 minutes at 320° C., 1.290 g of 1,4-bis(4'-fluorobenzoyl)benzene were added to the reaction mixture while keeping a nitrogen purge on the reactor. After 5 minutes, 0.424 g of lithium chloride were added to the reaction mixture. 10 minutes later, another 0.323 g of 1,4-bis(4'-fluorobenzoyl)benzene were added to the reaction flask and the reaction mixture was kept at temperature for 15 minutes.

The contents of the reaction flask were then poured into a stainless steel pan and cooled. The solid was broken up and ground in an attrition mill through a 2 mm screen. Diphenyl sulfone and salts were extracted from the mixture with acetone and water at pH between 1 and 12. The powder was then removed from the reactor and dried at 120° C. under vacuum for 12 hours yielding 52 g of an off-white/yellow powder. The final polymer had a T/I ratio of 71/29.

The PEKK polymer was analyzed as described above, and the results are displayed in Tables 1 and 2.

Example 14: Preparation of PEKK with 71/29 T/I Ratio

This example demonstrates the synthesis and analysis of PEKK using a nucleophilic synthetic route.

102.27 g of diphenyl sulfone, 18.463 g of 1,3-bis(4'-hydroxybenzoyl)benzene, 6.344 g of $Na_2CO_3$ and 0.032 g of $K_2CO_3$ were added to a 500 mL 4-neck reaction flask. The reaction flask was fitted with a stirrer, a $N_2$ inlet tube, a Claisen adapter with a thermocouple plunging in the reaction medium, and a Dean-Stark trap with a condenser and a dry ice trap. The flask content was evacuated under vacuum and then filled with high purity nitrogen (containing less than 10 ppm O2). The reaction mixture was then placed under a constant nitrogen purge (60 mL/min).

The reaction mixture was heated slowly to 200° C. At 200° C., 18.918 g of 1,4-bis(4'-fluorobenzoyl)benzene, were added via a powder dispenser to the reaction mixture over 30 minutes. At the end of the addition, the reaction mixture was heated to 220° C. at 1° C./minute.

At 220° C., a mixture of 13.699 g of 1,4-bis(4'-fluorobenzoyl)benzene, 13.370 g of 1,4-bis(4'-hydroxybenzoyl)benzene, 4.594 g of $Na_2CO_3$ and 0.023 g of $K_2CO_3$ was added slowly to the reaction mixture over 30 minutes.

At the end of the addition, the reaction mixture was heated to 320° C. at 1° C./minute. After 9 minutes at 320° C., 2.579 g of 1,4-bis(4'-fluorobenzoyl)benzene were added to the reaction mixture while keeping a nitrogen purge on the reactor. After 5 minutes, 0.424 g of lithium chloride were added to the reaction mixture. 10 minutes later, another 0.323 g of 1,4-bis(4'-fluorobenzoyl)benzene were added to the reaction flask and the reaction mixture was kept at temperature for 15 minutes.

The contents of the reaction flask were then poured from into a stainless steel pan and cooled. The solid was broken up and ground in an attrition mill through a 2 mm screen. Diphenyl sulfone and salts were extracted from the mixture with acetone and water at pH between 1 and 12. The powder was then removed from the reactor and dried at 120° C. under vacuum for 12 hours yielding 52 g of an off-white/yellow powder. The final polymer had a T/I ratio of 71/29.

The PEKK polymer was analyzed as described above, and the results are displayed in Tables 1 and 2.

Example 15: Synthesis and Analysis of PEKK with 71/29 T/I Ratio

This example demonstrates the synthesis and analysis of PEKK using a nucleophilic synthetic route.

102.27 g of diphenyl sulfone, 18.463 g of 1,3-bis(4'-hydroxybenzoyl)benzene, 6.332 g of $Na_2CO_3$ and 0.040 g of $K_2CO_3$ were added to a 500 mL 4-neck reaction flask. The flask was fitted with a stirrer, a $N_2$ inlet tube, a Claisen adapter with a thermocouple plunging in the reaction medium, and a Dean-Stark trap with a condenser and a dry ice trap. The flask contents were evacuated under vacuum and then filled with high purity nitrogen (containing less than 10 ppm $O_2$). The reaction mixture was then placed under a constant nitrogen purge (60 mL/min).

The reaction mixture was heated slowly to 200° C. At 200° C., 18.918 g of 1,4-bis(4'-fluorobenzoyl)benzene, were added via a powder dispenser to the reaction mixture over 30 minutes. At the end of the addition, the reaction mixture was heated to 240° C. at 1° C./minute.

At 240° C., a mixture of 13.699 g of 1,4-bis(4'-fluorobenzoyl)benzene, 13.370 g of 1,4-bis(4'-hydroxybenzoyl)benzene, 4.585 g of $Na_2CO_3$ and 0.029 g of $K_2CO_3$ was added slowly to the reaction mixture over 30 minutes.

At the end of the addition, the reaction mixture was heated to 320° C. at 1° C./minute. After 5 minutes at 320° C., 2.579 g of 1,4-bis(4'-fluorobenzoyl)benzene were added to the reaction mixture while keeping a nitrogen purge on the reactor. After 5 minutes, 0.424 g of lithium chloride were added to the reaction mixture. 10 minutes later, another 0.323 g of 1,4-bis(4'-fluorobenzoyl)benzene were added to the reactor and the reaction mixture was kept at temperature for 15 minutes.

The contents of the reaction flask were then poured into a stainless steel pan and cooled. The solid was broken up and ground in an attrition mill through a 2 mm screen. Diphenyl sulfone and salts were extracted from the mixture with acetone and water at pH between 1 and 12. The powder was then removed from the reactor and dried at 120° C. under vacuum for 12 hours yielding 54 g of an off-white/yellow powder. The final polymer had a T/I ratio of 71/29.

The PEKK polymer was analyzed as described above, and the results are displayed in Tables 1 and 2.

Example 16: Synthesis and Analysis of PEKK with 71/29 T/I Ratio

This example demonstrates the synthesis and analysis of PEKK using a nucleophilic synthetic route.

In a 500 mL 4-neck reaction flask fitted with a stirrer, a N2 inlet tube, a Claisen adapter with a thermocouple plunging in the reaction medium, and a Dean-Stark trap with a condenser and a dry ice trap were introduced 102.27 g of diphenyl sulfone, 18.463 g of 1,3-bis(4'-hydroxybenzoyl) benzene, 6.344 g of Na2CO3 and 0.062 g of K2CO3. The flask content was evacuated under vacuum and then filled with high purity nitrogen (containing less than 10 ppm O2). The reaction mixture was then placed under a constant nitrogen purge (60 mL/min).

The reaction mixture was heated slowly to 200° C. At 200° C., 18.918 g of 1,4-bis(4'-fluorobenzoyl)benzene, were added via a powder dispenser to the reaction mixture over 30 minutes. At the end of the addition, the reaction mixture was heated to 240° C. at 1° C./minute.

At 240° C., a mixture of 13.699 g of 1,4-bis(4'-fluorobenzoyl)benzene, 13.370 g of 1,4-bis(4'-hydroxybenzoyl)benzene and 4.595 g of Na$_2$CO$_3$ was added slowly to the reaction mixture over 30 minutes.

At the end of the addition, the reaction mixture was heated to 320° C. at 1° C./minute. After 150 minutes at 320° C., 1.290 g of 1,4-bis(4'-fluorobenzoyl)benzene were added to the reaction mixture while keeping a nitrogen purge on the reactor. After 5 minutes, 0.424 g of lithium chloride were added to the reaction mixture. 10 minutes later, another 0.323 g of 1,4-bis(4'-fluorobenzoyl)benzene were added to the reactor and the reaction mixture was kept at temperature for 15 minutes.

The reactor content was then poured from the reactor into a stainless steel pan and cooled. The solid was broken up and ground in an attrition mill through a 2 mm screen. Diphenyl sulfone and salts were extracted from the mixture with acetone and water at pH between 1 and 12. The powder was then removed from the reactor and dried at 120° C. under vacuum for 12 hours yielding 52 g of an off-white/yellow powder. The final polymer had a T/I ratio of 71/29. The PEKK polymer was analyzed as described above, and the results are displayed in Tables 1 and 2.

Results

Table 1 displays a summary of the synthesis conditions for each of the examples. In Table 1, the following abbreviations are used : 14BHBB refers to 1,4-bis(4'-hydroxybenzoyl)benzene; 13BHBB refers to 1,3-bis(4'-hydroxybenzoyl)benzene; 14DFDK refers to 1,4-bis(4'-fluorobenzoyl) benzene; and 13DFDK refers to 1,3-bis(4'-fluorobenzoyl)benzene.

| Example | (Moles R$^P_{PEKK}$)/ (Moles R$^M_{PEKK}$) | mol % 14BHBB (relative to mol 13BHBB + 14BHBB) | mol Na$_2$CO$_3$; mol K$_2$CO$_3$ (relative to mol 13BHBB + 14BHBB) | Premixing of Monomers (monomers; temperature ° C.) | First Addition of Monomers (reagent, T in ° C.) |
|---|---|---|---|---|---|
| CE1 | | | | | |
| CE2 | 70/30 | 100 | 1.030; 0.0 | 14BHBB + 14DFDK + 13DFDK; 25 | |
| CE3 | 72/28 | 100 | 1.040; 0.0 | 14BHBB + 14DFDK + 13DFDK; 25; | |
| CE4 | 72/28 | 100 | 1.040; 0.0 | 14BHBB + 14DFDK + 13DFDK, 180 | |
| CE5 | 72/28 | 72 | 1.040; 0.0 | 14BHBB + 13BHBB + 14DFDK + 13DFDK; 25 and 180 | |
| CE6 | 72/28 | 44 | 1.040; 0.0 | 14BHBB + 13BHBB + 14DFDK, 25 and 180 | |
| CE7 | 71/29 | 42 | 1.040; 0.0 | 14BHBB + 13BHBB + 14DFDK; 25 and 180 | |
| CE8 | 70/30 | 100 | 1.030; 0.45 | 4BHBB + 14DFDK + 13DFDK; and 25 | |
| CE9 | 70/30 | 100 | 1.030; 0.45 | 14BHBB + 14DFDK + 13DFDK; 25 and 200 | |
| E10 | 71/29 | 42 | 1.035; 0.0050 | 13BHBB + 14DFDK, 25 and 180 | 14DFDK + 14BHBB; 220 |
| E11 | 71/29 | 42 | 1.035; 0.0020 | 13BHBB + 14DFDK, 25 and 180 | 14DFDK + 14BHBB; 220 |
| E12 | 71/29 | 42 | 1.030; 0.0050 | 13BHBB + 14DFDK, 25 and 200 | 14DFDK + 14BHBB; 240 |
| E13 | 71/29 | 42 | 1.032; 0.0045 | 13BHBB + 14DFDK, 25 and 200 | 14DFDK + 14BHBB; 240 |
| E14 | 71/29 | 42 | 1.032; 0.0040 | 13BHBB + 14DFDK, 25 and 200 | 14DFDK + 14BHBB; 220 |
| E15 | 71/29 | 42 | 1.032; 0.0050 | 13BHBB + 14DFDK, 25 and 200 | 14DFDK + 14BHBB; 240 |
| E16 | 71/29 | 42 | 1.032; 0.0045 | 13BHBB + 14DFDK, 25 and 200 | 14DFDK + 14BHBB; 240 |

Referring to Table 1, the PEKK polymers according to Examples 1 to 9 were formed using traditional synthetic approaches and, therefore, the resulting PEKK polymers are referred to as traditional PEKK polymers. The PEKK polymer of Example 1 was synthesized using an electrophilic scheme and the PEKK polymers of Examples 2 to 9 were synthesized using a nucleophilic scheme. The PEKK polymers of Examples 10 to 16 were synthesized according the methods described herein. In contrast with Examples 2 to 9, the synthesis of the PEKK polymers 10 to 16 involved a first addition of reactants at 200-260° C.

The physical and mechanical properties of the PEKK polymers were analyzed as described above in this Examples section. The results are provided in Tables 2 and 3.

TABLE 2

| Example | IV (dL/g) | Tg (° C.) | T$^{(e)}_g$ (° C.) | Tm (° C.) | ΔHf (J/g) | ΔH$^{(e)}_f$ (J/g) | [Cl] by TOX (ppm) | Td(1%) (° C.) by TGA |
|---|---|---|---|---|---|---|---|---|
| CE1 | 1.04 | 153 | | 166 | 336 | 37.5 | 33.7 | 1825 | 373 |
| CE2 | 1.52 | 168 | | 167 | 329 | 29.2 | 27.7 | N/A | |
| CE3 | 0.83 | 165 | | 164 | 342 | 36.3 | 36.4 | N/A | |

TABLE 2-continued

| Example | IV (dL/g) | Tg (° C.) | $T^{(e)}_g$ (° C.) | Tm (° C.) | ΔHf (J/g) | $\Delta H^{(e)}_f$ (J/g) | [Cl] by TOX (ppm) | Td(1%) (° C.) by TGA |
|---|---|---|---|---|---|---|---|---|
| CE4 | 0.95 | 167 | 165 | 343 | 35.5 | 30.5 | N/A | |
| CE5 | 1.11 | 169 | 166 | 345 | 32.4 | 32.9 | N/A | |
| CE6 | 1.30 | 170 | 167 | 335 | 28.1 | 34.9 | N/A | |
| CE7 | 1.01 | 166 | 166 | 339 | 35.0 | 34.1 | N/A | |
| CE8 | 1.54 | 167 | 167 | 332 | 34.0 | 27.5 | 43 | 504 |
| CE9 | 1.42 | 169 | 167 | 329 | 31.1 | 29.0 | 11 | 503 |
| 10 | 0.83 | 163 | 164 | 341 | 42.5 | 36.4 | N/A | |
| 11 | 0.98 | 161 | 165 | 340 | 35.6 | 34.5 | N/A | |
| 11 | 0.87 | 162 | 165 | 349 | 39.5 | 35.9 | N/A | |
| 12 | 1.00 | 164 | 165 | 342 | 43.0 | 34.3 | 32 | 514 |
| 13 | 0.81 | 162 | 164 | 341 | 43.0 | 36.7 | N/A | |
| 15 | 0.82 | 162 | 164 | 344 | 43.8 | 36.5 | N/A | |
| 16 | 0.82 | 163 | 164 | 344 | 45.0 | 36.5 | 53 | 510 |

TABLE 3

| Example | MV (380° C.) | Tensile strength at yield (psi) | Elongation at yield (%) | Elongation at break (%) | Tensile modulus (kpsi) | % crystallinity of the plaque |
|---|---|---|---|---|---|---|
| CE9 | 5447 | 13300 | 4.6 | 11.0 | 511 | 23.1 |
| 15 | 528 | 16500 | 4.6 | 10.0 | 704 | 29.1 |
| 16 | 503 | 17300 | 4.6 | 10.0 | 594 | 35.4 |

Referring to TABLES 1 and 2, the PEKK polymers of examples 10 to 16 had decreased Tg and increased crystallinity, relative to what was expected based upon the traditional PEKK polymers of examples 2 to 9. The Expected Tg ($T_g^{(e)}$) and expected $\Delta H_F$ ($\Delta H_F^{(e)}$) were determined by measuring and plotting Tg vs. $1/\eta_{inh}$ and $\Delta H_f$ vs. $\eta_{inh}$ for the traditional PEKK polymers (examples 1 to 9). The plots were then respectively fit to the following equations: $T_g = T_g^{(0)} - m_T/\eta_{inh}$ and $\Delta H_F = \Delta H_F^{(0)} - m_H \eta_{inh}$, respectively. The fits yielded to following results: $T_g^{(0)}$(171° C.) $m_T$=5.53, $\Delta H_F^{(0)}$=46.85 and $m_H$=12.6.

Each PEKK polymer of examples 10 to 16 had a Tg that was lower than the expected Tg. On the other hand, the expected Tg of the traditional PEKK polymers of counter examples 2 to 9 were higher than the expected Tg in each case. Similar results were seen for the crystallinity, as measured by the heat of fusion. In particular, each PEKK polymer of examples 10 to 16 had higher than expected $\Delta H_F$, while the traditional PEKK polymers of counter examples 2 to 9 had a $\Delta H_F$ lower than expected. With respect to the traditional PEKK polymer of counter example 1, it had both a decreased Tg as well as an increased $\Delta H_F$, relative to the respective expected values. However, the traditional PEKK polymer of counter example 1 was synthesized via an electrophilic route, while the PEKK polymers of examples 10 to 16 were synthesized via a nucleophilic route. As discussed above and demonstrated in Table 2, PEKK polymers synthesized via electrophilic addition have significantly increased residual chlorine content and reduced thermal stability, relative to corresponding PEKK polymers synthesized via nucleophilic substitution. For example, the traditional PEKK polymer of counter example 1 (electrophilic addition) had a chlorine concentration of 1825 parts per million by weight ("ppm") and Td (1%) of 373° C., while the PEKK polymer of example 16 (synthesized by nucleophilic substitution) had chlorine concentration of 53 ppm and Td (1%) of 510° C., reflecting a 97% reduction in residual chlorine in synthesized PEKK polymer and a higher thermal stability allowing to limit the degradation observed during the melt processing of the polymer.

Referring to Tables 1 and 3, the PEKK polymers of examples 15 and 16 and significantly improved tensile strength at yield while retaining good elongation at break and crystallinities of molded plaques for a much lower melt viscosity, relative to traditional PEKK polymers. For example, the tensile strength at yield of the PEKK polymers of examples 15 and 16 were improved by 24% and 30% increase, respectively, relative to the traditional PEKK polymer of counter example 9. Similarly, the % crystallinity of the plaques molded from the PEKK polymers of examples 15 and 16 were 29.1% and 35.4%, respectively, which represented a 26% and 53% improvement in crystallinity, relative to the traditional PEKK polymer of counter example 9.

Should the disclosure of any patents, patent applications, and publications which are incorporated herein by reference conflict with the description of the present application to the extent that it may render a term unclear, the present description shall take precedence.

The invention claimed is:
1. A PEKK polymer comprising,
at least one recurring unit ($R^M_{PEKK}$) comprising a recurring unit ($R^{PM*}_{PEKK}$), each represented by a distint formula according to the general formula:

—[—$M_m$—O—]—,  (1) and at least one a recurring unit ($R^{PP*}_{PEKK}$), each represented by a distinct formula according to the following general formula:

—[—$M_p$—O—]—,  (2)

wherein
(a) $M_m$ and $M_p$, are represented by the following formulae, respectively:

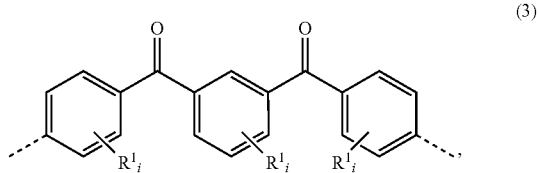

(3)

-continued

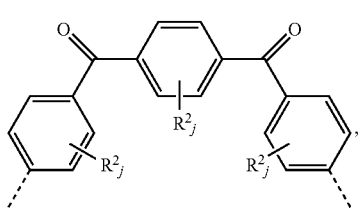
(4)

wherein
R¹ and R², at each instance, is independently selected from the group consisting of an alkyl, an alkenyl, an alkynyl, an aryl, an ether, a thioether, a carboxylic acid, an ester, an amide, an imide, an alkali or alkaline earth metal sulfonate, an alkyl sulfonate, an alkali or alkaline earth metal phosphonate, an alkyl phosphonate, an amine, and a quaternary ammonium; and i and j, at each instance, is an independently selected integer ranging from 0 to 4; and (a) the total concentration of the at least one recurring unit ($R^M_{PEKK}$) and the at least one recurring unit ($R^P_{PEKK}$) is at least 50 mol %, relative to the total number of moles of recurring units in the PEKK polymer;

(b) the ratio of the number of moles the at least one recurring unit ($R^P_{PEKK}$) to the number of moles of the late least one recurring unit ($R^M_{PEKK}$) is at least 1.5:1 to 5.7:1;

(c) the PEKK polymer has a $\Delta T_g$ of at least 1.5° C., and has a Td(1%) of at least 490° C., as measured by thermal gravimetric analysis according to ASTM D3850, heating from 30° C. to 800° C. using a heating rate of 10° C./min. wherein $\Delta T_g$ is given by the following formula $$\Delta T_g = 171 - \frac{5.53}{\eta_{inh}} - T_g,$$
(8)

$T_g$ is the glass transition temperature of the PEKK polymer, as measured at mid-point according to ASTM D3418, E1356 using a heating and cooling rate of 20° C./min, $\eta_{inh}$ is the inherent viscosity of the PEKK polymer, as measured according to ASTM D2857 using a testing temperature of 30° C. and a testing solution comprising 0.5 wt./vol. % solution of the PEKK polymer in concentrated $H_2SO_4$.

2. A method of forming the poly(ether ketone ketone), (PEKK) polymer, of claim 1 comprising at least one recurring unit ($R^M_{PEKK}$) and at least one recurring unit ($R^P_{PEKK}$), the method comprising:

a first heating comprising heating a reaction mixture comprising a first monomer blend or a second monomer blend to a first temperature of from 200° C. to 260° C.;

a first addition comprising adding to the reaction mixture subsequent to the first heating either
a second monomer blend, if the first heating comprises heating the reaction mixture comprising the first monomer blend or
the first monomer blend, if the first heating comprises heating the reaction mixture comprising the second monomer blend, and a second heating comprising heating the reaction mixture to a second temperature of from 300° C. to 340° C., wherein (a) the first monomer blend comprises
(i) $N^*_M$ moles of at least one 1,3-bis(benzoyl) benzene monomer, where $N^*_M$ is substantially equimolar to $N_M$ and $N_M$ is the total number of moles of recurring units ($R^M_{PEKK}$) in the PEKK polymer and
(ii) and from 0 to $N^*_M$ moles of at least one first 1,4-bis(benzoyl) benzene monomer
(iii) wherein the number of moles of bis(hydroxyl benzoyl) benzene monomers is substantially equimolar to the number of moles of bis(halo benzoyl) benzene monomers (b) the second monomer blend comprises
(i) at least one second 1,4-bis(benzoyl) benzene monomer,
(ii) at least one third 1,4-bis(benzoyl) benzene monomer, and
(iii) from 0 to 0.1* Nm moles of at least one second 1,3-bis(benzoyl) benzene monomer,
(iv) wherein the number of moles of bis(hydroxyl benzoyl) benzene monomers is substantially equimolar to the number of moles of bis(halo benzoyl) benzene monomers (c) each 1,3-bis(benzoyl) benzene monomer is independently represented by the following formula

(9)

wherein $X^5$ is either an —OH or halogen and (d) each 1,4-bis(benzoyl) benzene monomer is independently represented by the following formulae, respectively:

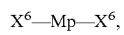

wherein $X^6$ is an —OH or halogen, and (e) $M_m$ and $M_p$, are represented by the following formulae, respectively:

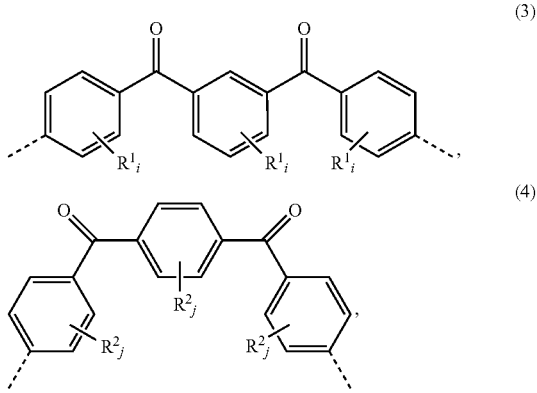

wherein
R¹ and R², at each instance, is independently selected from the group consisting of an alkyl, an alkenyl, an alkynyl, an aryl, an ether, a thioether, a carboxylic acid, an ester, an amide, an imide, an alkali or alkaline earth metal sulfonate, an alkyl sulfonate, an alkali or alkaline earth metal phosphonate, an alkyl phosphonate, an amine, and a quaternary ammonium; and i and j, at each instance, is an independently selected integer ranging from 0 to 4; and wherein
(f) each of the at least one recurring units ($R^M_{PEKK}$) and ($R^P_{PEKK}$) is distinctly and independently represented by the following formulae, respectively:

 (1)

 (2)

(g) the ratio of the number of moles of the at least one recurring units ($R^P_{PEKK}$) to the number of moles of recurring units ($R^M_{PEKK}$) is at least 1.5:1 to 5.7:1.

3. The method of claim 2, wherein
(a) the first monomer blend comprises $0.90 N^*_p$ to $1.10 N^*_p$ of the at least one first 1,4-bis(benzoyl) benzene monomer, where $N^*_p = N_m - (N^{OH}_m + N^X_m)$; $(N^{OH}_m + N^X_m) \leq N_m$, $N^{OH}_m$ is the number of moles of the at least one 1,3-bis(benzoyl) benzene monomers that are 1,3-bis(hydroxybenzoyl) benzene monomers, and $N^X_m$ is the number of moles of the at least one 1,3-bis(benzoyl) benzene monomers that are 1,3-bis(halobenzoyl) benzene monomers and
(b) The second monomer blend comprises $0.45(N_p - N^*_p)$ moles to $0.55(N_p - N^*_p)$ moles of the least one second 1,4-bis(benzoyl) benzene monomer, wherein $N_P$ is the total number of moles of recurring units ($R^P_{PEKK}$) in the PEKK polymer.

4. The method of claim 2, wherein
(a) the first heating further comprises maintaining the temperature of the reaction mixture within a first temperature range of from 200° C. to 260° C. for a first time period of 5 min. to 300 min; or
(b) the second heating further comprises maintaining the temperature of the reaction mixture within a second temperature range of from 300° C. to 340° C. for a second period of time of from less than 1 min. to 240 min., 180 min. or 120 min.

5. The method of claim 2, wherein the second heating further includes a second addition comprising adding an end-capping agent to the reaction mixture and wherein the end-capping agent comprises an excess of a bis(halobenzoyl) benzene monomer of the at least first or second 1,3-bis(benzoyl) benzene monomers or the at least one first, second or third 1,4-bis(benzoyl) benzene monomers or a monomer represented by the following formula:

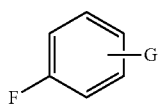

where G is —C(O)—Ar or S(O2)—Ar, and Ar is an arylene group.

6. The method of claim 2, wherein
(a) the first monomer blend comprises a first alkali metal carbonate having a concentration that is at least 0.95 times, preferably at least 1.02 times, more preferably at least 1.03 times the number of moles of bis(hydroxybenzoyl) benzene monomers in the first monomer blend, or
(b) the second monomer blend comprises a second alkali metal carbonate having a concentration that is at least 0.95 times, preferably at least 1.02 times, more preferably at least 1.03 times the number of moles of bis(hydroxybenzoyl) benzene monomers in the second monomer blend.

7. The method of claim 6, wherein the first alkali metal carbonate and second alkali metal carbonate are independently selected from the group consisting of $Na_2CO_3$, $K_2CO_3$, and a combination thereof and the total concentration of $Na_2CO_3$ and $K_2CO_3$ is substantially equimolar relative to the number of moles of bis(hydroxybenzoyl) benzene.

8. The method of claim 2, wherein
(a) one of the at least one 1,3-bis(benzoyl) benzene monomer is represented by the following formula:

 (16)

wherein $X^1$ is either an —OH or halogen (b) one of each of the at least one first, second and third 1,4-bis(benzoyl) benzene monomers is represented by the following formulae, respectively:

 (17)

 (18)

 (19)

wherein
$X^2$ is a halogen if $X^1$ is —OH and $X^2$ is an —OH if $X^1$ is a halogen,
$X^3$ is —OH or a halogen and
$X^4$ is a halogen if $X^3$ is an —OH and $X^4$ is —OH if $X^3$ is a halogen and (c) $M^{1*}_m$, $M^{1*}_p$, $M^{2*}_p$, and $M^{3*}_p$ are represented by the following formulae, respectively:

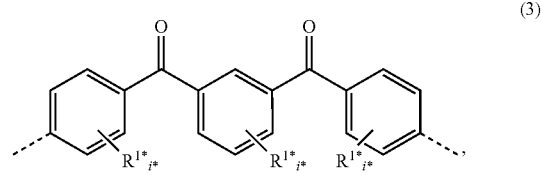 (3)

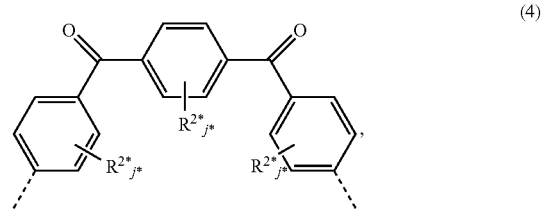 (4)

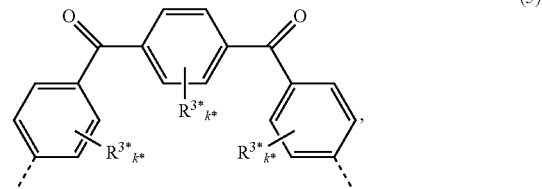 (5)

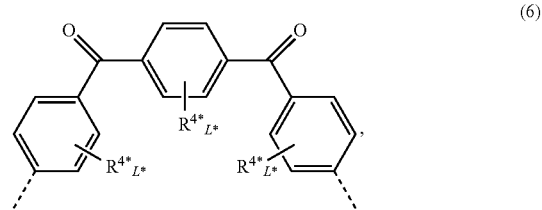 (6)

wherein
$R^{1*}$, $R^{2*}$, $R^{3*}$ and $R^{4*}$, at each instance, is independently selected from the group consisting of an alkyl, an alkenyl, an alkynyl, an aryl, an ether, a thioether, a carboxylic acid, an ester, an amide, an imide, an alkali or alkaline earth metal sulfonate, an alkyl sulfonate, an alkali or alkaline earth metal phosphonate, an alkyl phosphonate, an amine, and a quaternary ammonium; and i*, j*, k* and L*, at each instance, is an independently selected integer ranging from 0 to 4; and wherein
(a) the at least one recurring units ($R^M_{PEKK}$) comprises a recurring unit ($R^{M1}_{PEKK}$) represented by the formula:

$$—[—M^{1*}_m—O—]— \text{ and} \qquad (5)$$

and
(b) the at least one recurring units ($R^P_{PEKK}$) is a recurring units ($R^{P1}_{PEKK}$), ($R^{P2}_{PEKK}$), and ($R^{P3}_{PEKK}$), represented by the following formula, respectively:

$$—[—M^{1*}_p—O—]—, \qquad (6)$$

$$—[—M^{2*}_p—O—]—, \text{ and} \qquad (7)$$

$$—[—M^{3*}_p—O—]—. \qquad (8)$$

9. The method of claim 8, wherein each i*, j*, k* and L* is zero.

10. The method of claim 8, wherein the ratio of the number of moles of recurring units ($R^{P1}_{PEKK}$), ($R^{P2}_{PEKK}$), and ($R^{P3}_{PEKK}$) to the number of moles of recurring unit $R^{M1}_{PEKK}$) is at least 1.5:1 to 5.7:1.

11. The method of claim 2, wherein the total concentration of recurring units ($R^{M1}_{PEKK}$), ($R^{P1}_{PEKK}$), ($R^{P2}_{PEKK}$), and ($R^{P3}_{PEKK}$) in the PEKK polymer is at least 80 mol %, relative to the total number of recurring units in the PEKK polymer.

12. The method of claim 2, wherein the PEKK polymer has a $\Delta T_g$ of at least 1.5° C., wherein
$\Delta T_g$ is given by the following formula $$\Delta T_g = 171 - \frac{5.53}{\eta_{inh}} - T_g,$$

$T_g$ is the glass transition temperature of the PEKK polymer, as measured at mid-point according to ASTM D3418, E1356 using a heating and cooling rate of 20° C./min, and $\eta_{inh}$ is the inherent viscosity of the PEKK polymer, as measured according to ASTM D2857 using a testing temperature of 30° C. and a testing solution comprising 0.5 wt./vol. % solution of the PEKK polymer in concentrated $H_2SO_4$.

13. The method of claim 2, wherein the PEKK polymer has a ratio of the number of moles of the at least one recurring units ($R^P_{PEKK}$) to the number of moles of recurring units ($R^M_{PEKK}$) of at least 1.9:1 to 3.0:1, preferably 2.1:1 to 2.7 and a $\Delta(\Delta H_f)$ that is at least 1 J/g, preferably at least 3 J/g, wherein
$\Delta(\Delta H_f)$ is given by the following formula $$\Delta(\Delta H_F)=\Delta H_F-46.85 \ 12.6\mu_{inh},$$

$\Delta H_f$ is the heat of fusion of the PEKK polymer, as measured according to ASTM D3418, E1356 using a heating a cooling rate of 20° C./min, and $\eta_{inh}$ is the inherent viscosity of the PEKK polymer, as measured according to ASTM D2857 using a testing temperature of 30° C. and a testing solution comprising 0.5 wt/vol % solution of the PEKK polymer in concentrated $H_2SO_4$.

14. The method of claim 2, wherein the PEKK polymer has a Td(1%) of at least 490° C., as measured by thermal gravimetric analysis according to ASTM D3850, heating from 30° C. to 800° C. using a heating rate of 10° C./min.

15. The method of claim 2, wherein the PEKK polymer has an inherent viscosity ($\eta_{inh}$) of from 0.40 dL/g to 1.50 dL/g, as measured according to ASTM D2857 using a testing temperature of 30° C. and a testing solution comprising 0.5 wt./vol. % solution of the PEKK polymer in concentrated $H_2SO_4$.

16. The method of claim 2, wherein the ratio of the number of moles of the at least one recurring units ($R^P_{PEKK}$) to the number of moles of recurring units ($R^M_{PEKK}$) is at least 1.8:1 to 3:1.

17. The method of claim 10, wherein the ratio of the number of moles of recurring units ($R^{P1}_{PEKK}$), ($R^{P2}_{PEKK}$), and ($R^{P3}_{PEKK}$) to the number of moles of recurring unit $R^{M1}_{PEKK}$) is at least 1.8:1 to 3:1.

18. The PEKK polymer of claim 1, wherein the total concentration of the at least one recurring unit ($R^M_{PEKK}$) and the at least one recurring unit ($R^P_{PEKK}$) is at least 60 mol %, relative to the total number of moles of recurring units in the PEKK polymer.

19. The PEKK polymer of claim 1, wherein the total concentration of the at least one recurring unit ($R^M_{PEKK}$) and the at least one recurring unit ($R^P_{PEKK}$) is at least 95 mol %, relative to the total number of moles of recurring units in the PEKK polymer.

20. The PEKK polymer of claim 1, wherein the ratio of the number of moles the at least one recurring unit ($R^P_{PEKK}$) to the number of moles of the at least one recurring unit ($R^M_{PEKK}$) is at least 1.8:1 to 5:1.

21. The PEKK polymer of claim 1, wherein the ratio of the number of moles the at least one recurring unit ($R^P_{PEKK}$) to the number of moles of the at least one recurring unit ($R^M_{PEKK}$) is at least 2.1:1 to 2.7:1.

22. The PEKK polymer of claim 1, wherein (a) the at least one recurring units ($R^M_{PEKK}$) comprises a recurring unit ($R^{M1}_{PEKK}$) represented by the formula:

$$—[—M^{1*}_m—O—]— \qquad (5) \text{ and}$$

(b) the at least one recurring units ($R^P_{PEKK}$) comprises a recurring units ($R^{P1}_{PEKK}$), ($R^{P2}_{PEKK}$), and ($R^{P3}_{PEKK}$), represented by the following formula, respectively:

$$—[—M^{1*}_p—O—]—, \qquad (6)$$

$$—[—M^{2*}_p—O—]—, \qquad (7) \text{ and}$$

$$—[M^{3*}_p—O—]—, \qquad (8)$$

where $M^{1*}_m$, $M^{1*}_p$, $M^{2*}_p$, and $M^{3*}_p$ are represented by the following formulae, respectively:

(9)

[chemical structure showing a tris-benzoyl compound with three phenyl rings connected by carbonyl groups, each phenyl bearing $R^{1*}_{i*}$ substituents]

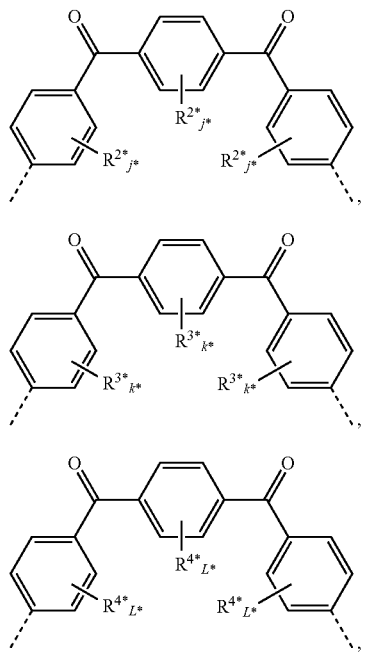

(10)

(11)

(12)

where $R^{1*}$, $R^{2*}$, $R^{3*}$ and $R^{4*}$, at each instance, is independently selected from the group consisting of an alkyl, an alkenyl, an alkynyl, an aryl, an ether, a thioether, a carboxylic acid, an ester, an amide, an imide, an alkali or alkaline earth metal sulfonate, an alkyl sulfonate, an alkali or alkaline earth metal phosphonate, an alkyl phosphonate, an amine, and a quaternary ammonium; and $i^*$, $j^*$, $k^*$ and $L^*$, at each instance, is an indepedently selected integer ranging from 0 to 4.

23. The PEKK polymer of claim 22, wherein each $i^*$, $j^*$, $k^*$ and $L^*$ is zero.

24. The PEKK polymer of claim 1, wherein the $\Delta T_g$ is of at least 1.5° C. and of no more than 10° C.

25. The PEKK polymer of claim 1, wherein the polymer exhibits a melting temperature $T_m$ from 290° C. to 370° C.

26. The PEKK polymer of claim 1, wherein the inherent viscosity is from 0.40 dL/g to 1.50 dL/g.

27. The PEKK polymer of claim 1, wherein the polymer has a residual chlorine concentration of less than 900 ppm.

28. The PEKK polymer of claim 27, wherein the polymer exhibits a $\Delta(\Delta Hf)$ of at least 2 J/g and of no more than 20 J/g.

29. The PEKK polymer of claim 1, wherein the Td(1%) is of at least 495° C.

30. A composition comprising the PEKK polymer of claim 1 and further comprising:
one or more reinforcing fillers selected from the group consisting of fibrous fillers and particulate fillers, wherein
the fibrous filler is selected from the group consisting of glass fiber, carbon fiber, synthetic polymeric fiber, aramid fiber, aluminum fiber, titanium fiber, magnesium fiber, boron carbide fiber, rock wool fiber, steel fiber, and wollastonite; and
the particulate filler is selected from the group consisting of talc, mica, kaolin, calcium carbonate, calcium silicate, and magnesium carbonate; and/or
one or more additional ingredients selected from the group consisting of:
(i) colorants
(ii) pigments
(iii) light stabilizers
(iv) heat stabilizers
(v) antioxidants
(vi) acid scavengers
(vii) processing aids
(viii) nucleating agents
(ix) plasticizer, internal lubricants, and external lubricants
(x) flame retardants
(xi) smoke suppressing agents
(xii) anti-static agents
(xiii) anti-blocking agents
(xiv) conductivity additives
(xv) plasticizers
(xvi) flow modifiers
(xvii) extenders
(xviii) metal deactivators,
or any combination thereof.

31. The composition of claim 30, wherein the total concentration of additional ingredients is below 20%, based upon the total weight of the polymer composition.

32. A composition comprising the PEKK polymer of claim 1 and further comprising one or more than one additional polymeric components.

33. The composition of claim 32, wherein the one or more than one additional polymeric components is selected from the group consisting of poly(ether ether ketone) polymers, poly(ether ketone) polymers, sulfone polymers, and polyaryl sulphide polymers.

* * * * *